(12) United States Patent
Zuo et al.

(10) Patent No.: US 10,203,017 B2
(45) Date of Patent: Feb. 12, 2019

(54) FLUID-FILLED PISTON CYLINDER UNIT

(71) Applicant: SUSPA GmbH, Altdorf (DE)

(72) Inventors: Houzheng Zuo, Nanjing (CN);
Christian Eiletz, Altdorf (DE)

(73) Assignee: SUSPA GmbH, Altdorf (DE)

( * ) Notice: Subject to any disclaimer, the term of this patent is extended or adjusted under 35 U.S.C. 154(b) by 0 days.

(21) Appl. No.: 15/416,523

(22) Filed: Jan. 26, 2017

(65) Prior Publication Data
US 2017/0211653 A1    Jul. 27, 2017

(30) Foreign Application Priority Data

Jan. 27, 2016 (DE) .......................... 10 2016 201 155
Nov. 25, 2016 (DE) .......................... 10 2016 223 486

(51) Int. Cl.
| | |
|---|---|
| *F16F 9/516* | (2006.01) |
| *F16F 9/02* | (2006.01) |
| *F16F 9/32* | (2006.01) |
| *F16F 9/34* | (2006.01) |
| *F16F 9/36* | (2006.01) |
| *F16F 9/44* | (2006.01) |

(52) U.S. Cl.
CPC .......... *F16F 9/5165* (2013.01); *F16F 9/0218* (2013.01); *F16F 9/0227* (2013.01); *F16F 9/0281* (2013.01); *F16F 9/3214* (2013.01); *F16F 9/34* (2013.01); *F16F 9/368* (2013.01); *F16F 9/446* (2013.01); *F16F 2222/126* (2013.01); *F16F 2228/066* (2013.01)

(58) Field of Classification Search
CPC ...... F16F 9/5165; F16F 9/0218; F16F 9/0227; F16F 9/368; F16F 9/3214; F16F 9/34; F16F 9/446; F16F 9/0281; F16F 222/126; F16F 2228/066
See application file for complete search history.

(56) References Cited

U.S. PATENT DOCUMENTS

| | | | | |
|---|---|---|---|---|
| 4,156,523 A * | 5/1979 | Bauer | .................... | F16F 9/0227 |
| | | | | 267/120 |
| 4,433,759 A * | 2/1984 | Ichinose | .................. | E05C 17/30 |
| | | | | 16/51 |
| 5,839,719 A * | 11/1998 | Hosan | .................... | B62D 25/12 |
| | | | | 188/300 |
| 2013/0020158 A1* | 1/2013 | Park | ...................... | F16F 9/3405 |
| | | | | 188/280 |
| 2013/0161138 A1* | 6/2013 | Barefoot | .................. | F16F 9/34 |
| | | | | 188/282.1 |
| 2014/0048366 A1* | 2/2014 | Lee | .......................... | F16F 9/34 |
| | | | | 188/322.15 |

FOREIGN PATENT DOCUMENTS

DE    26 53 552 C2    6/1982

* cited by examiner

*Primary Examiner* — Vishal R Sahni
(74) *Attorney, Agent, or Firm* — McGlew and Tuttle, P.C.

(57) ABSTRACT

A fluid-filled piston cylinder unit comprises a housing with a longitudinal axis and with an interior, a piston rod guided out from the housing in a sealing manner, which can be displaced along the longitudinal axis, as well as a piston connected to the piston rod, which divides the interior into a first sub-interior and a second sub-interior. The piston has a first fluid channel and a second fluid channel in each case for a fluid flow between the first sub-interior and the second sub-interior. The piston has a piston valve for closing the first fluid channel, whereby the piston valve in dependence of a fluid pressure opens the first fluid channel.

17 Claims, 21 Drawing Sheets

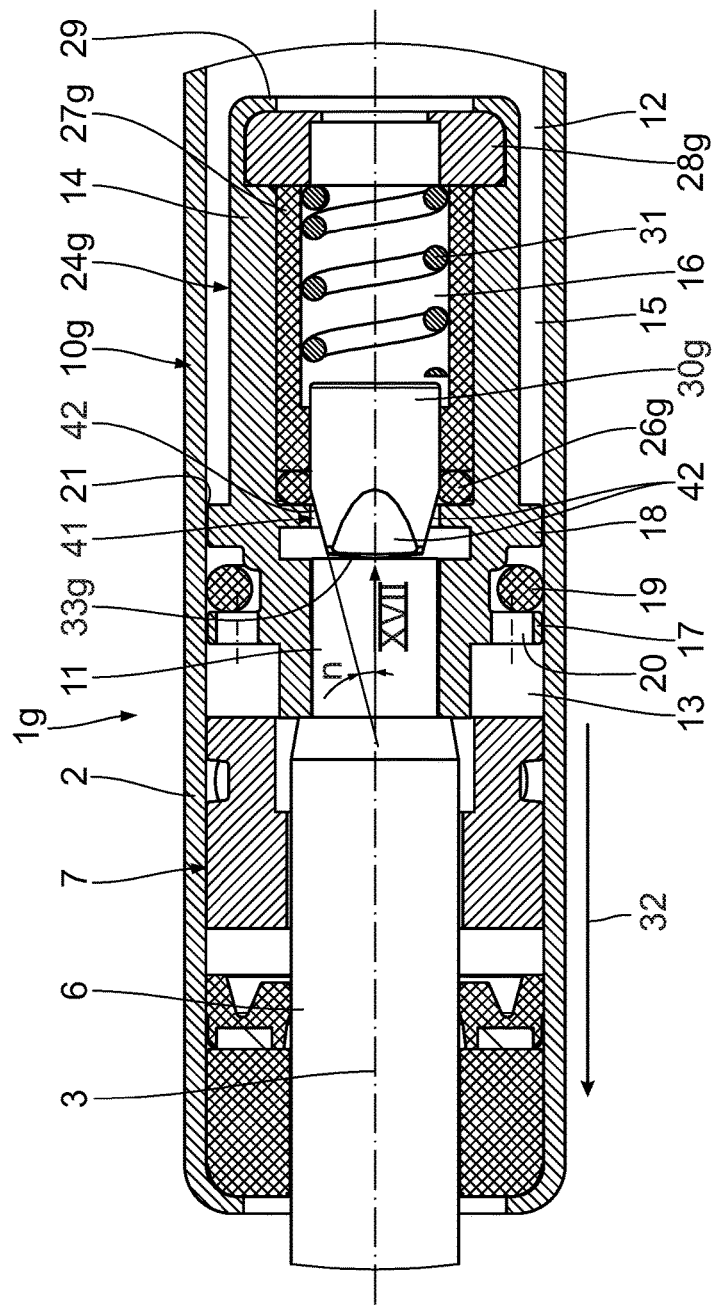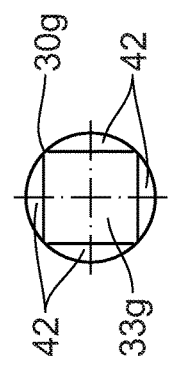
Fig. 16
Fig. 17

FLUID-FILLED PISTON CYLINDER UNIT

CROSS-REFERENCES TO RELATED APPLICATIONS

This application claims the priority of German Patent Application, Serial No. 10 2016 201 155.3, filed Jan. 27, 2016, and of German Patent Application, Serial No. 10 2016 223 486.2, filed Nov. 25, 2016, pursuant to 35 U.S.C. 119(a)-(d), the content of which is incorporated herein by reference in its entirety as if fully set forth herein.

FIELD OF THE INVENTION

The invention relates to a fluid-filled piston cylinder unit.

BACKGROUND OF THE INVENTION

DE 26 53 552 C2 discloses a gas spring to open and to hold components in an open position. The structure of the gas spring is complex.

SUMMARY OF THE INVENTION

An object of the invention is to provide a simplified fluid-filled piston cylinder unit.

The object is achieved by a fluid-filled piston cylinder unit comprising a housing with a longitudinal axis and with an interior, a piston rod leading out from the housing in a sealing manner, which can be displaced along the longitudinal axis, and a piston connected to the piston rod, wherein the piston divides the interior into a first sub-interior and a second sub-interior, the piston has a first fluid channel and a second fluid channel for a fluid flow between the first sub-interior and the second sub-interior in each case, the piston has a piston valve for closing the first fluid channel, and the piston valve in dependence of a fluid pressure opens the first fluid channel.

The core of the invention consists in that a fluid-filled piston cylinder unit has a piston to be moved in a housing with a first fluid channel and a second fluid channel. The fluid channels in each case allow a fluid to flow from a first sub-interior into a second sub-interior of the housing and vice versa. The piston has a piston valve, which closes the first fluid channel and in dependence of a fluid pressure opens the first fluid channel. The piston valve enables the pressure to be balanced between the sub-interiors in dependence of an excess pressure in the one sub-interior in relation to the other sub-interior. Particularly in dependence of the differential pressure the piston valve switches between the sub-interiors. The fluid-filled piston cylinder unit is in particular a gas spring, more particularly with a pressure relief valve. The gas spring is also known as hydraulic aid. The hydraulic aid permits the weight to be balanced, i.e. a tiltable component as for example for a tailgate can be held in an opened position. Holding the hydraulic aid in the opened position, in particular manually, can be over-ridden due to the excess pressure function of the inventive piston cylinder unit. The hydraulic aid also permits the displacement movement of the piston rod along the longitudinal axis in relation to the housing to be dynamically damped. The fluid-filled inventive piston cylinder unit is robust and stable in operation. Fluctuations and/or tolerances of the weight of the component to be held, its center of gravity position and the gas pressure in the piston cylinder unit do not have a disadvantageous affect on the support function of the gas spring. The function of a blockable gas spring is produced by means of the additional piston valve. Blocking of the gas spring can be overcome, for example manually, by over-riding an, in particular adjustable, force plane in the closed direction. The force plane to be over-ridden corresponds to the differential pressure between the sub-interiors as well as a friction-burdened, spring-biased valve opening force. The function of the inventive piston cylinder unit is improved. The structure is uncomplicated and therefore simplified. Because two fluid channels separate from one another are provided, the fluid channels can be used separately from each other and in particular sealed off separately from each other. In particular the first fluid channel can be sealed off independently of the second fluid channel. In particular separate sealing elements serve this purpose, whereby the sealing function and in particular the overload function of the piston valve are improved. The inventive piston cylinder unit does not manifest notable, undefined sealing situations. In particular the piston valve can be integrated flexibly into the piston cylinder unit. It is possible to adapt and, in particular reverse, the working direction of the piston valve for a desired purpose of the piston cylinder unit.

This means that the piston valve can be configured such that it is basically closed when the piston rod with the piston is pushed into the housing and opens when the piston rod with the piston connected to it is pulled out if the variable fluid pressure is exceeded. Conversely the piston valve can be configured such that if the fluid pressure is exceeded when the piston rod with the piston is pushed in, especially the first fluid channel is opened and with a pull-out movement of the piston rod is closed.

A piston having a sleeve element, wherein especially the first fluid channel is located within the sleeve element and wherein especially the second fluid channel is located outside of the sleeve element, ensures uncomplicated separation of the fluid channels. By means of a sleeve element an outside, annular subspace is formed between the sleeve element and the housing. The outside subspace can be used as the second fluid channel. A substantially tubular internal subspace, which in particular can be used as the first fluid channel is available within the sleeve element.

An outer sealing element for sealing the second fluid channel in dependence of a displacement direction of the piston rod allows direct sealing of the second fluid channel in dependence of a displacement direction of the piston rod. The sealing of the second fluid channel is uncomplicated.

A piston, in which the outer sealing element is located along the second fluid channel between a first radial web and a second radial web of the piston spaced at a distance along the longitudinal axis, simplifies the sealing function of the outer sealing element. A first and a second radial web of the piston serve to axially limit displacement of the outer sealing element. The outer sealing element can be moved along the longitudinal axis.

Interaction of the outer sealing element with the second radial web, in which the outer sealing element can be laid on the second radial web in a sealing manner for sealing the second fluid channel, allows for direct sealing of the second fluid channel. In particular an annular radial gap, which can be sealed off by contact with the outer sealing element, reliably results between the second radial web and the housing. In particular the first radial web is configured such that contact with the outer sealing element does not cause the second fluid channel to be sealed off. By the outer sealing element resting on the first radial web, a fluid flow is ensured along the second fluid channel. For this purpose the first radial web can be configured for example with at least one through-hole, which cannot be sealed off by the, in particular annular, outer sealing element.

Configuration of the piston valve, in which the piston valve has a closing element which can be displaced along the longitudinal axis and/or a valve seat and/or a spring element, ensures a reliable and uncomplicated embodiment. An axially displaceable closing element can rest against a valve seat in a sealing manner. The piston valve can also be designed without a valve seat, i.e. seatless. A spring element ensures reliable seating of the closing element on the valve seat. The spring element is in particular configured as coil spring, more particularly made of metal, especially spring steel.

A spring element exerting a spring action on the closing element for closing the piston valve, wherein the spring action is oriented at least proportionately toward the valve seat, ensures adequate spring action on the closing element. The closing function of the piston valve is ensured, especially in an inactivated state of the piston cylinder unit. The spring action is at least proportionately oriented toward the valve seat and in particular parallel to the longitudinal axis of the housing. The spring action exerted by the spring element works against an internal pressure in one of the sub-interiors.

When the fluid-filled piston cylinder unit is operated in a corresponding displacement direction of the piston rod the difference of pressure in the sub-interiors causes a fluid force directed against the spring action, which induces the piston valve to open if the spring action is exceeded. The spring action of the spring element determines the fluid pressure, in dependence on which the piston valve opens the first fluid channel. In particular the spring action is adjustable. The spring action can be adjusted for example by replacing the spring element. Spring elements of different materials and/or geometry have different spring rates, from which different spring actions on the closing element result. Additionally or alternatively the bias, with which the spring element is incorporated in the piston valve, can be influenced purposefully. In dependence of the bias when the spring element is installed into the piston valve the bias considered is important.

A piston valve having an internal sealing element, against which the closing element rests for closing the piston valve, wherein especially the internal sealing element is arranged in the vicinity of the valve seat, enables the first fluid channel to be reliably sealed off. The closing element can rest directly against the internal sealing element. In particular it is possible to reduce the dimensions of the closing element. The smaller the dimensions of the closing element, the more the tolerance deviations at the sealing point between the closing element and the rear sealing element and/or concerning the spring action to be applied, can be reduced. An arrangement of the internal sealing element in the vicinity of the valve seat ensures direct and reliable sealing of the first fluid channel.

An embodiment of the closing element, in which the closing element is uneven at the front side, prevents adhesion effects and/or the closing element adhering to the piston rod. For this purpose the closing element on the front side can have a domed, hemispherical, truncated pyramid and/or cone shape.

A sealing layer of the closing element, in which the closing element has a sealing layer for closing the piston valve, allows for a more simplified structure. An internal sealing element is unnecessary. Because the closing element has its own sealing layer, the closing element can rest directly on the valve seat of the piston valve for sealing the first fluid channel. The closing element for example is made of metal, in particular steel, and has an exterior coating, for example a rubber coating.

An embodiment of the closing element, in which the closing element is formed as cylinder piston or as spherical element, ensures both stable axial displacement when the piston cylinder unit is activated and in particular when the piston valve is operated, reliable sealing contact on the valve seat, in particular an internal sealing element, and also a reliable, in particular guided contact on the spring element, which in particular is configured as coil spring.

With a closing element, in which the closing element has an integrated throttle channel with a flow cross-section, disturbing flow noises from the piston cylinder unit can be avoided. In particular the piston valve can be moved in a clearly defined way. The closing element can have a flow transition area, so that a flow cross-section of a throttle channel on opening the piston valve is opened throttled and especially throttled without interruption. Abrupt, complete opening of the flow cross-section is avoided. In particular oscillations through flow noises caused by repetitive opening and closing operations are avoided. Abrupt opening of the maximum flow face by the closing element lifting from the internal sealing element is prevented. The flow transition area is particularly conical in places and/or configured with at least one inclined face extending along the longitudinal axis. Additionally or alternatively the throttle channel can be radially drilled or bored. In particular non linear recesses, which are configured especially hemispherically, can also be provided. A piston cylinder unit with a closing element configured in this way is especially suitable for noiseless operation.

The embodiment of the sleeve element, in which the sleeve element on an end turned away from the piston rod has a collar, which is turned inward in particular radially, ensures a compact structure. Additional elements for shutting off the sleeve element are unnecessary.

A connection, in which the sleeve element is detachably connected to the piston rod, in particular screwed on a spigot of the piston rod, ensures simplified assembly of the piston cylinder unit.

A spring setting element for variably adjusting the fluid pressure for releasing the piston valve permits variable adjustment of the fluid pressure, with which the piston valve opens the first fluid channel. In particular the spring setting element is configured as setting element which can be arranged variably along the longitudinal axis. The spring setting element is in particular configured as threaded element, which can be screwed on/in the sleeve element of the piston. By screwing the spring setting element in/on, it can be steplessly moved in axial direction along the longitudinal axis and as a result infinite variation of the bias of the spring element of the piston valve is possible.

Further advantageous arrangements, additional features and details of the invention will become clear from the following description of six exemplary embodiments on the basis of the drawing.

BRIEF DESCRIPTION OF THE DRAWING

FIG. 16 shows an illustration corresponding to FIG. 2 of a piston cylinder unit in accordance with an eighth exemplary embodiment, FIG. 17 shows a view in accordance with arrow XVII in FIG. 16.

DESCRIPTION OF THE PREFERRED EMBODIMENTS

Figure 1:
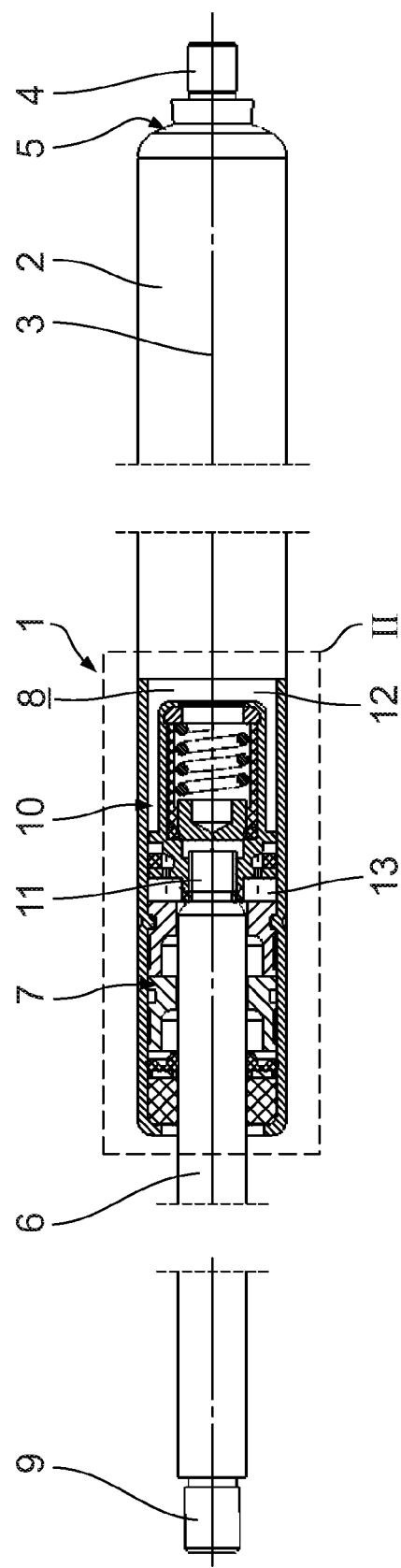
FIG. 1 shows a profile of an inventive piston cylinder unit in accordance with a first exemplary embodiment.
Figure 2:
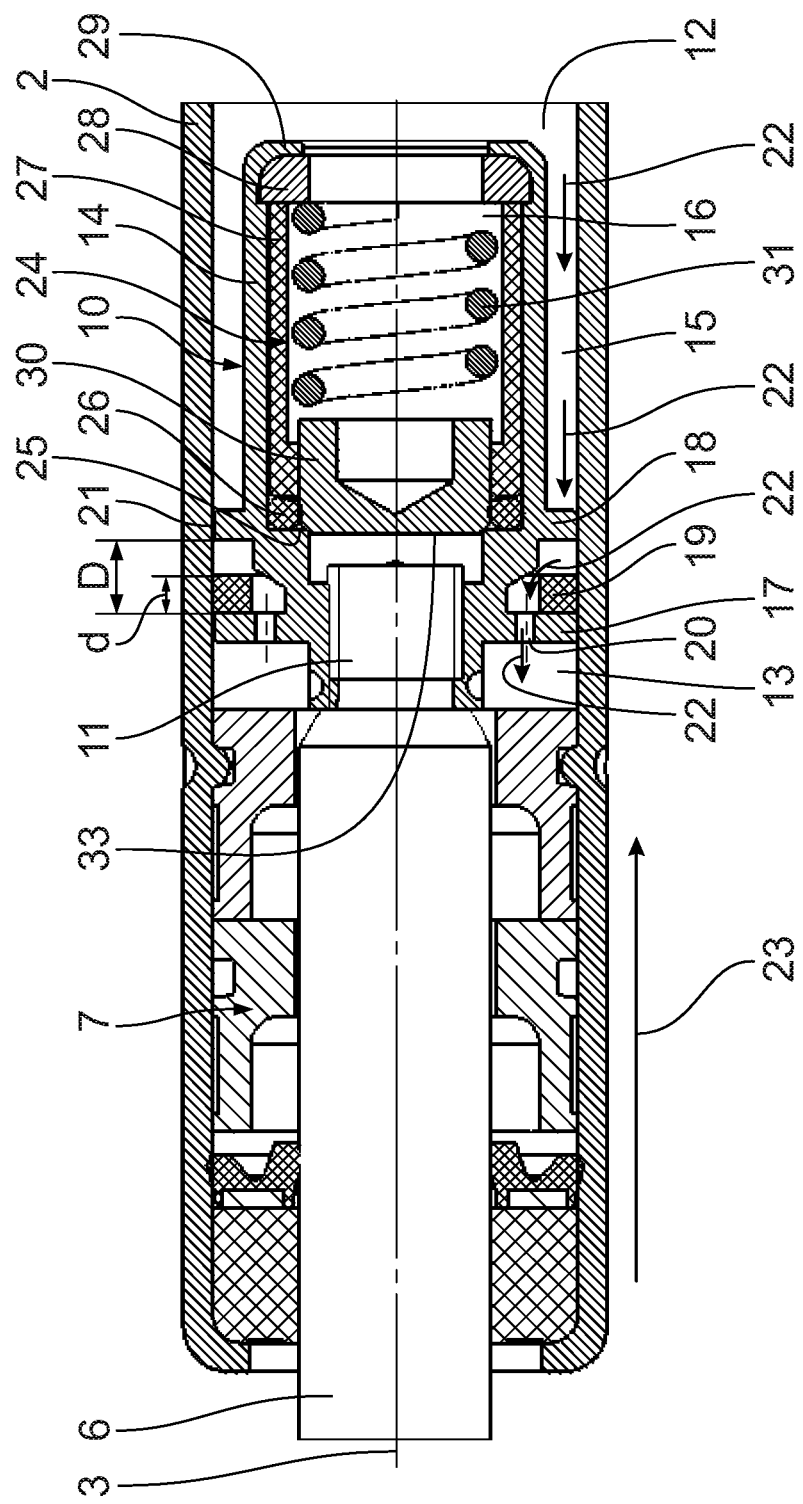
FIG. 2 shows an enlarged detail view in accordance with detail II in FIG. 1 when the piston cylinder unit is operated along a push-in direction.
Figure 3:
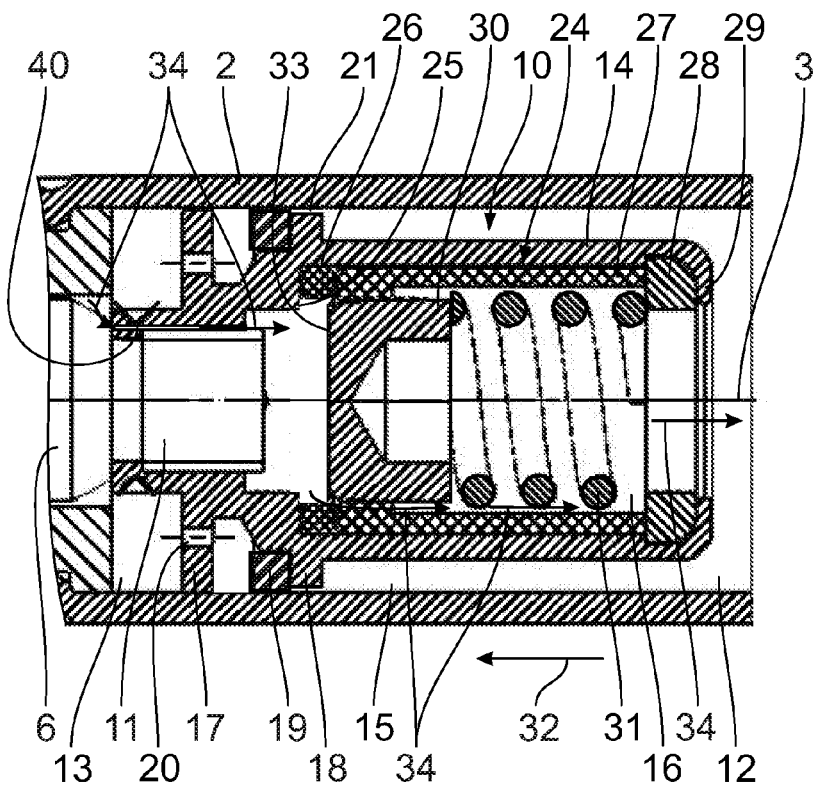
FIG. 3 shows an illustration corresponding to FIG. 2 when the piston rod is operated in the pull-out direction.

A gas spring illustrated in FIGS. 1 to 3 is a piston cylinder unit 1. The piston cylinder unit 1 is filled, i.e. fluid-filled with a gas. The piston cylinder unit 1 has a substantially cylindrical housing 2 with a longitudinal axis 3. The housing 2 has an interior 8. The pressure fluid, i.e. the gas, is disposed in the interior 8. The housing 2 comprises a first fastening part 4 on a first end, illustrated on the right in FIG. 1. The first fastening part 4 serves for linking on a first part, to which the piston cylinder unit 1 is to be connected. At the first end the housing 2 is closed off by means of a cover 5 moulded on in one piece. The first fastening part 4 is arranged on the cover 5. The cover 5 is generally unclosed in relation to end of the housing 2. At the unclosed end a piston rod 6 leads out from the housing 2. In the vicinity of the opened end of the housing 2 a guide/sealing unit 7 is integrated in the housing 2. By means of the guide/sealing unit 7 the piston rod 6 leads out from the housing 2 in a sealed manner. The guide/sealing unit 7 ensures guided displacement of the piston rod 6 parallel to the longitudinal axis 3.

The guide/sealing unit 7 has several guidance and sealing elements not described in detail. The guide/sealing unit 7 is axially held in the housing 2 in relation to the longitudinal axis 3.

The piston rod 6 is substantially configured as solid cylinder. A second fastening part 9 at the first end illustrated on the left in FIG. 1 is moulded on the piston rod 6 in one piece. The second fastening part 9 is arranged outside of the housing 2. The opposite-lying end of the piston rod 6 is disposed within the housing 2. The second fastening part 9 serves to link the piston cylinder unit 1 on a second part, the movement of which, in particular its displacement, is designed to be displaceable in relation to the first part power-assisted and/or damped by means of the piston cylinder unit 1. At this end a piston 10 is screwed onto a spigot 11 of the piston rod 6 on the piston rod 6. The piston rod 6 can be moved together with the piston 10 along the longitudinal axis 3 guided in the housing 2. The piston 10 can be moved in the housing 2 in a sealing manner. The piston 10 divides the interior 8 into a first sub-interior 12 and a second sub-interior 13. The first sub-interior 12 is delimited by the housing 2, i.e. the hydraulic cylinder jacket wall, with the cover 5 and by the piston 10. The second sub-interior 13 is delimited by the piston 10, the hydraulic cylinder jacket wall of the housing 2 and the guide/sealing unit 7.

The piston 10 comprises a sleeve element 14 illustrated in FIG. 2. The sleeve element 14 is oriented in the housing 2 concentrically to the longitudinal axis 3. The sleeve element 14 is configured in one piece and more particularly made of metal. The sleeve element 14 divides the first sub-interior 12 into a substantially annular, outside subspace 15 and into an internal, substantially cylindrical subspace 16. The outside subspace 15 is delimited in radial direction in relation to the longitudinal axis 3 by the inner wall of the housing 2 and by the external wall of the sleeve element 14. At an outer side a first radial web 17 and a second radial web 18 are moulded on the sleeve element 14 in one piece. The first radial web 17 and the second radial web 18 in each case have an outside diameter, which substantially corresponds to the inside diameter of the housing 2. Along the longitudinal axis 3 the first radial web 17 and the second radial web 18 are spaced at distance to each other. Along the longitudinal axis 3 an outer sealing element 19 is disposed between the first radial web 17 and the second radial web 18. The outer sealing element 19 is configured as sealing ring, in particular as O-ring made of a sealing material as for example rubber and/or silicone.

The outer sealing element 19 has an outside diameter, which in particular is slightly larger than the inside diameter of the housing 2. The outer sealing element 19 can rest against the inner wall of the housing 2 in a sealing manner. The outer sealing element 19 can be moved in the housing 2 along the longitudinal axis 3. A thickness d of the outer sealing element 19 is smaller than a distance D between the front faces on the inside of the first radial web 17 and the second radial web 18.

The first radial web 17 has at least one through opening 20. The through opening 20 can be configured for example as axial bore along the longitudinal axis 3. The through opening 20 is configured so that it cannot be covered by the outer sealing element 19, not even if the outer sealing element 19 as illustrated in FIG. 2 at the front side rests against the first radial web 17. The first through opening 20 has a radial distance r to the longitudinal axis 3 which is smaller than the inside diameter of the outer sealing element 19.

The outside subspace 15, the not sealed annular gap 21 between an outer face of the second radial web 18 and the inner wall of the housing 2 and the through opening 20 define a second fluid channel. Pressure fluid can flow along the second fluid channel in accordance with the exemplary embodiment shown from the first sub-interior 12 into the second sub-interior 13. This fluid flow is symbolized by means of the arrows 22 in FIG. 2. The fluid flow 22, i.e. from the first sub-interior 12 into the second sub-interior 13, arises whenever the piston rod 6 with the piston 10 is moved in the push-in direction 23. The push-in direction 23 is oriented parallel to the longitudinal axis 3 and in accordance with FIG. 2 directed from left to right. The piston 10 is displaced into the housing 2 along the push-in direction 23, i.e. toward the cover 5.

A piston valve 24 is provided within the sleeve element 14. The piston valve 24 serves to shut off a fluid flow through the internal subspace 16. The piston valve 24 has a valve seat 25, which is embodied by a step-shaped contact shoulder in accordance with the exemplary embodiment shown. The contact shoulder is configured by a recess protruding radially inward, on which an internal sealing element 26 is axially held. The internal sealing element 26 is arranged in the vicinity of the valve seat 25. The internal sealing element 26 is an O-ring, which is held in axial direction by means of an inner sleeve 27 and a washer 28. The washer 28 is an annular washer. Within the vicinity of the washer 28 the sleeve element 14 has a radially inwardly turned collar 29. The collar 29 serves to protect the washer 28 axially.

Furthermore the piston valve 24 has a closing element 30 which can be displaced along the longitudinal axis 3. The closing element 30 serves sealing contact against the valve seat 25. By means of a spring element 31 in the form of a coil spring the closing element 30 is pressurized toward the valve seat 25. The spring element 31 exerts a spring action on the closing element 30 to close the piston valve 24. The spring action is oriented parallel to the longitudinal axis 3 and opposite to the push-in direction 23. The closing element 30 is configured as cylinder piston.

Adjacent to the internal sealing element 26 the inner sleeve 27 has a guide section. The guide section serves to guide the closing element 30 along the longitudinal axis 3. As a result of the longitudinal guidance of the closing element 30 the latter is prevented from tilting. The closing function of the piston valve 24 is ensured. The guide section is characterized in relation to the rest of the inner sleeve 27 in that an enlarged wall thickness is provided. The enlarged wall thickness in the guide section permits guided displacement of the closing element 30. In particular the inside diameter is coordinated with the outside diameter of the closing element 30 within the guide section of the inner sleeve 27.

In accordance with the exemplary embodiment shown in particular the housing 2, the sleeve element 14 and the closing element 30 in each case have a cylindrical shape. This means that the internal contour of the housing 2, the inner and outer contour of the sleeve element 14 and the outer contour of the closing element 30 are annularly configured in one plane perpendicular to the longitudinal axis 3 in each case. As a result the sealing functions can be implemented in a simplified and improved way. In principle it is also conceivable that the components mentioned and/or further components of the piston cylinder unit 1 in one plane have non-round contours perpendicular to the longitudinal axis 3.

The internal subspace 16 defines a first fluid channel, which in the case of an opened valve in accordance with FIG. 3 allows flow around the closing element 30 spaced at a distance from the valve seat 25 and therefore fluid can flow from the second sub-interior 13 into the first sub-interior 12.

The function of the piston cylinder unit with the piston valve 24 is described in detail below. An explanation of the improved, in particular increased static friction coefficient of the piston cylinder unit 1 is also described on the basis of FIG. 15. Based on the arrangement of the piston cylinder unit 1 the piston rod 6 with the piston connected to it is moved to the right along the push-in direction 23, i.e. toward the cover 5 of the housing 2. The volume of the first sub-interior 12 is reduced as a result of the piston rod 6 with the piston 10 being displaced. The gas supplied is compressed. The gas pressure in the first sub-interior 12 rises. The increased gas pressure in the first sub-interior 12 means that gas flows along the fluid flow 22 when the piston rod 6 is operated in the push-in direction 23 along the second, outside fluid channel into the second sub-interior 13.

The closing element 30, which is pressed by means of the spring element 31 against the valve seat 25, causes the first fluid channel to be sealed. No fluid can flow from the first sub-interior 12 into the second sub-interior 13 through the first fluid channel. Due to the increased gas pressure in the first sub-interior 12, the outer sealing element 19 is displaced counter to the operation direction, i.e. against the push-in direction 23 toward the first radial web 17. As a result the second, outer fluid channel is opened. The fluid flow 22 is made possible. When the piston rod is operated in the push-in direction 23 a fluid flow 22 exclusively takes place through the second fluid channel. The first fluid channel is blocked. Additionally the increased gas pressure in the first sub-interior as a consequence of the push-in movement of the piston rod 6 with the piston 10 causes the force component assisting the spring action, which induces additional pressing of the closing element 30 against the valve seat.

When the piston rod 6 with the piston 10 is operated in a pull-out direction 32 opposed to the push-in direction in accordance with FIG. 3 the volume of the second sub-interior 13 is reduced. The gas supplied in the second sub-interior 13 is compressed. The gas pressure in the second sub-interior 13 rises. The rising gas pressure in the second sub-interior 13 causes the outer sealing element 19 to be displaced toward the second radial web 18. The outer sealing element 19 rests against the second radial web 18 in a sealing manner. A fluid flow along the second, outside fluid channel is prevented when the piston rod 6 with the piston 10 is operated along the pull-out direction 32. The second fluid channel is closed.

Due to the increased gas pressure in the second sub-interior 13 a compressive force acts on the front face 33 of the closing element 30. The compressive force is oriented in the opposite direction to the pull-out direction 32 and in particular to the spring action caused by the spring element 31. Increasing displacement of the piston rod 6 with the piston 10 causes increasing volume reduction of the second sub-interior 13 and therefore an increasing rise of the gas pressure in the second sub-interior 13. As soon as the rise of the gas pressure in the second sub-interior 13 is such that the resulting compressive force on the closing element 30 is enough to permit displacement of the closing element 30 against the spring action and in particular against the pull-out direction 32, the closing element 30 is lifted off from the valve seat 25. In the configuration shown in FIG. 3 the closing element 30 is spaced at a distance from the valve seat 25 and especially from the internal sealing element 26. The internal, first fluid channel is opened. A fluid flow 34 is permitted from the second sub-interior 13 into the first sub-interior 12 when the piston rod 6 with the piston 10 is operated along the pull-out direction 32. The fluid flow from the second sub-interior 13 into the first sub-interior 12 takes place through at least one non-illustrated fluid channel, in particular two fluid channels, which extends substantially parallel to the longitudinal axis 3 and is arranged eccentrically to it. The fluid channels are arranged in particular diametrically opposite to the longitudinal axis 3. The fluid channels run in the vicinity of the internal thread of the piston 10, with which it is screwed onto the spigot 11 of the piston rod 6.

The pressure, which is sufficient to release the closing element 30 against the spring action from the valve seat 25, is a minimum differential pressure between the second sub-interior 13 and the first sub-interior 12. This minimum differential pressure is also known as excess pressure. The piston cylinder unit 1 is a gas spring. The piston valve 24 is a pressure relief valve. Due to the piston valve 24 the gas spring has a blocking function, which on further operation of the piston rod 6 with the piston 10, for example manually, can be over-ridden. The piston valve 24 acts as pressure relief valve in the pull-out direction 32, since in particular the spring action exerted by the spring element 31 works on the closing element 30 in the pull-out direction 32. The spring action works counter to the push-in direction 23.

Figure 4:
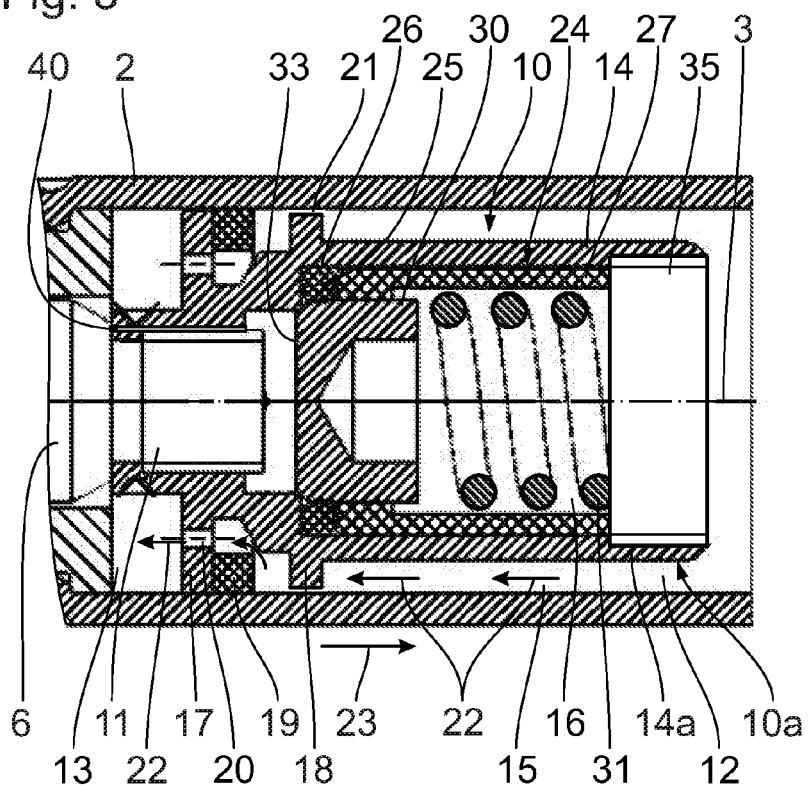
FIG. 4 shows an illustration corresponding to FIG. 2 of a piston cylinder unit in accordance with a second exemplary embodiment.

With reference to FIG. 4 a second exemplary embodiment of the invention is described below. Constructionally identical parts are given the same reference symbols as for the first exemplary embodiment, to the description of which reference is made herewith. Constructionally different, but functionally homogenous parts are given the same reference symbols followed by a.

The main difference of the piston cylinder unit 1a in comparison to the previous embodiment lies in the design of the piston 10a, with which the sleeve element 14a on the front face turned away from the first sub-interior 12 has a setting element 35. The setting element 35 in accordance with the exemplary embodiment shown is configured as screw bolt. The screw bolt has an external thread, in particular an external fine thread, which corresponds with a corresponding internal thread of the sleeve element 14a.

The spring element 31 is axially held by the setting element 35. In dependence of the thread projection of the setting element 35 into the sleeve element 14a, the spring travel of the spring element 31 and therefore the bias of the spring element are variably adjusted. By further pivoting of the setting element 35 into the sleeve element 14a, the bias of the spring element 31 and therefore the spring action, with which the closing element 30 is pressed against the valve seat 25, are increased. As a result the excess pressure, which is necessary to open the piston valve 24, is increased. The pressure, which causes the piston valve 24 to be released or opened, is variably adjustable by means of the setting element 35.

Figure 5:
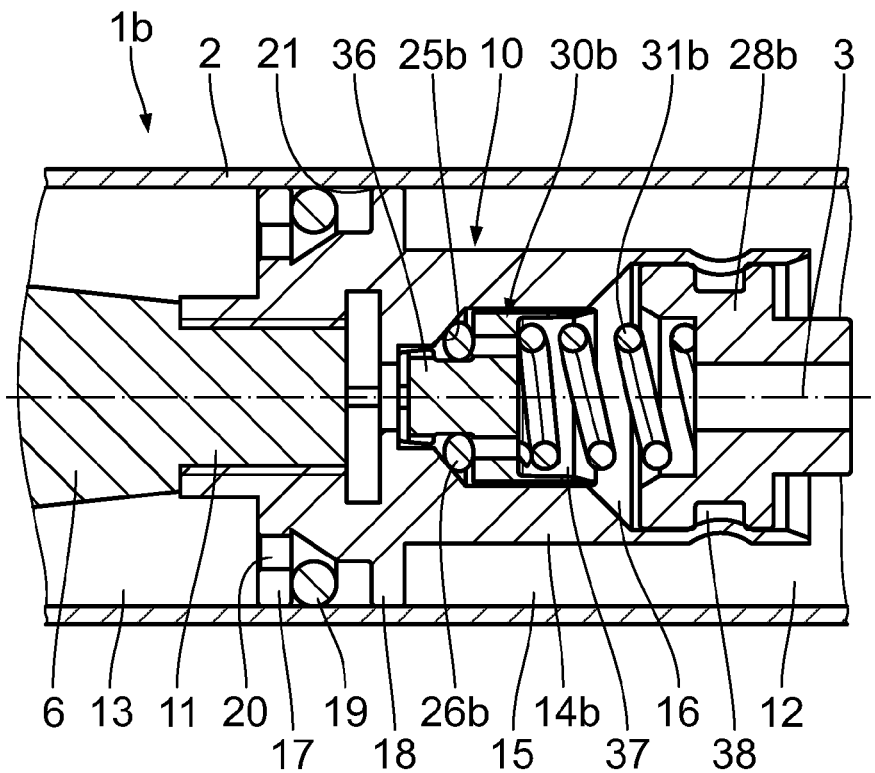
FIG. 5 shows an illustration corresponding to FIG. 2 of a piston cylinder unit in accordance with a third exemplary embodiment.
Figure 6:
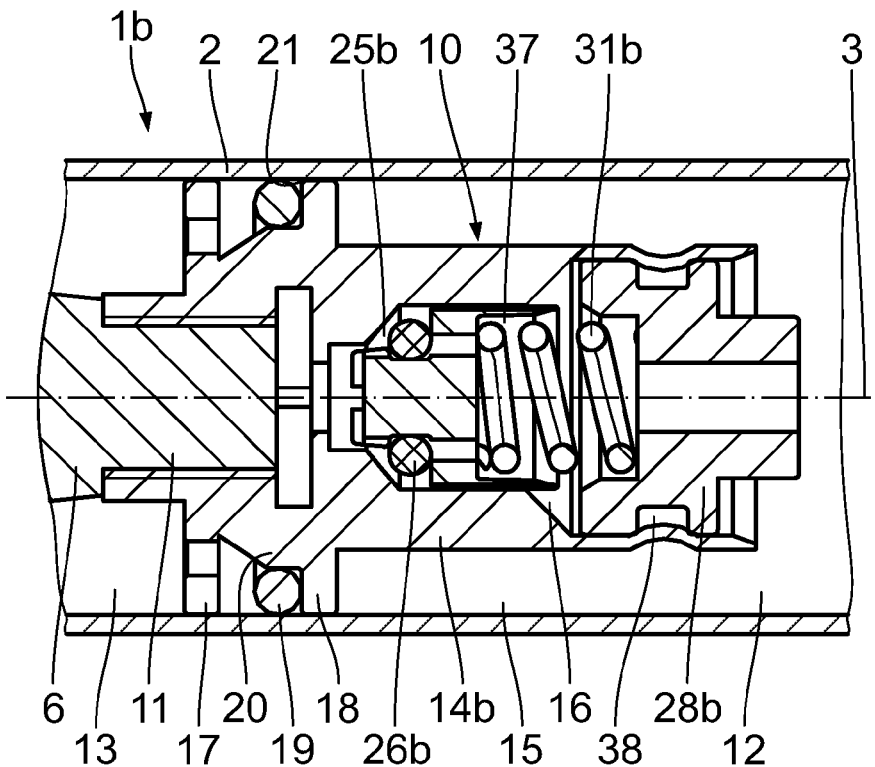
FIG. 6 shows an illustration of the piston cylinder unit in accordance with FIG. 5 when the piston rod is operated in the pull-out direction.

With reference to FIGS. 5 and 6 a third exemplary embodiment of the invention is described below. Constructionally identical parts are given the same reference symbols as for the two first exemplary embodiments, to the description of which reference is made herewith. Constructionally different, but functionally homogenous parts are given the same reference symbols followed by b.

The main difference in comparison to the first exemplary embodiment lies in the fact that the internal sealing element 26b is held by a journal-like sealing section 36 of the closing element 30b. When the closing element 30b is axially displaced, the internal sealing element 26b moves at the same time. At a rear end turned away from the internal sealing element 26b the closing element 30b has a sleeve section 37 moulded on in one piece. The spring element 31b rests against the sleeve section 37. The spring element 31b is guided by the guide section 37 both in the axial and in radial direction in relation to the longitudinal axis 3.

The outside diameter of the closing element 30b is adapted to the inside diameter of the sleeve element 14b. A separate inner sleeve, which in particular has an integrated guide section, is unnecessary.

A washer-type closing element 28b is provided at a rear end of the sleeve element 14b. The washer element 28b is axially held on the sleeve element 14b by crimping. For this purpose the washer element 28b has a circulating external groove 38, into which an external wall of the sleeve element 14b is plastically formed. The sleeve element 14b is permanently and firmly connected to the washer element 28b. The bias of the spring element 31b can be defined as a consequence of the axial positioning of the washer element 28b along the longitudinal axis 3.

The valve seat 25b is formed as a conically configured contact surface. The conical contact surface as valve seat has an advantageous, autocentering effect for contact of the internal sealing element 26b configured as O-ring.

Figure 7:
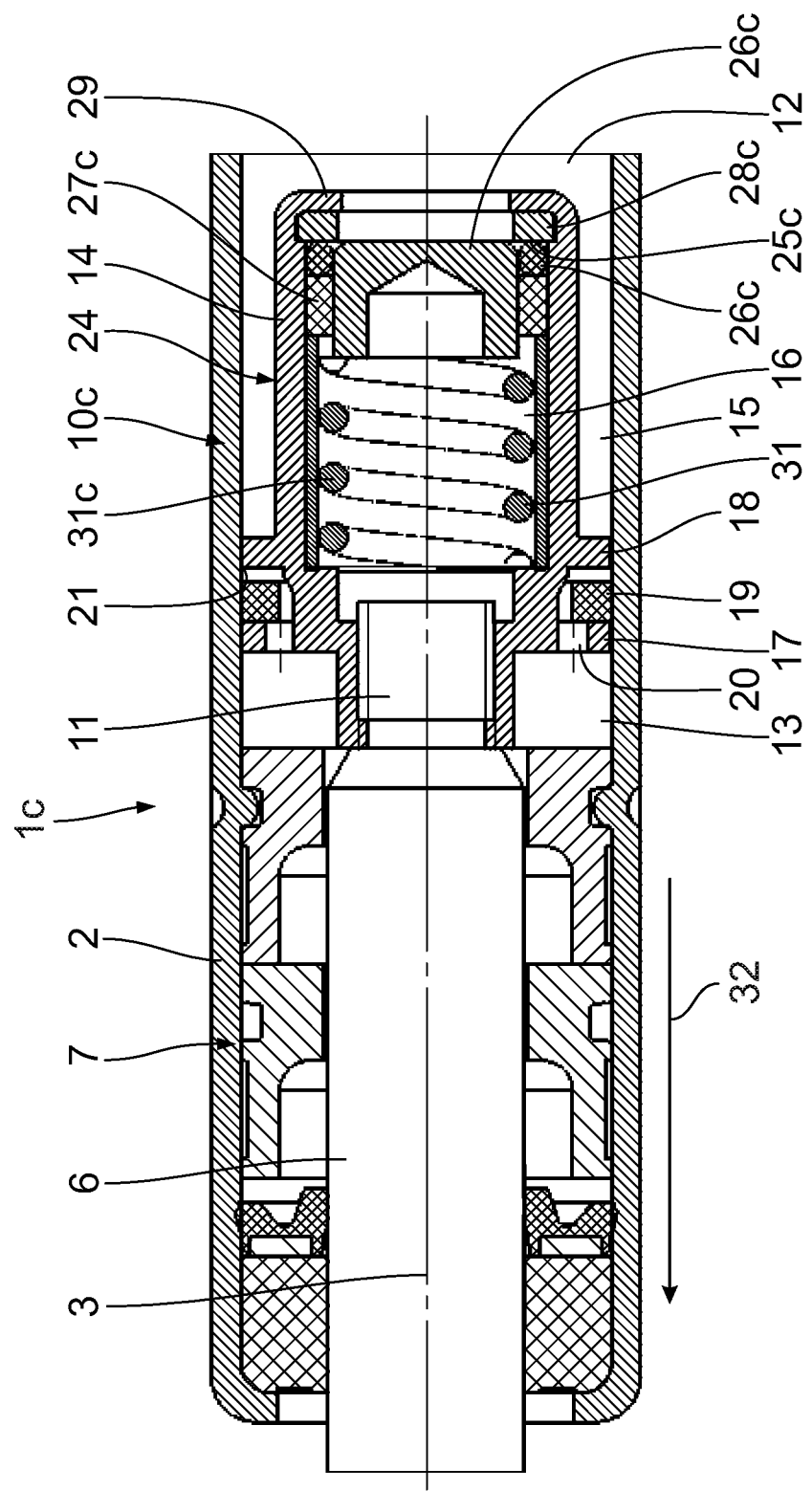
FIG. 7 shows an illustration corresponding to FIG. 6 of a piston cylinder unit in accordance with a fourth exemplary embodiment.
Figure 8:
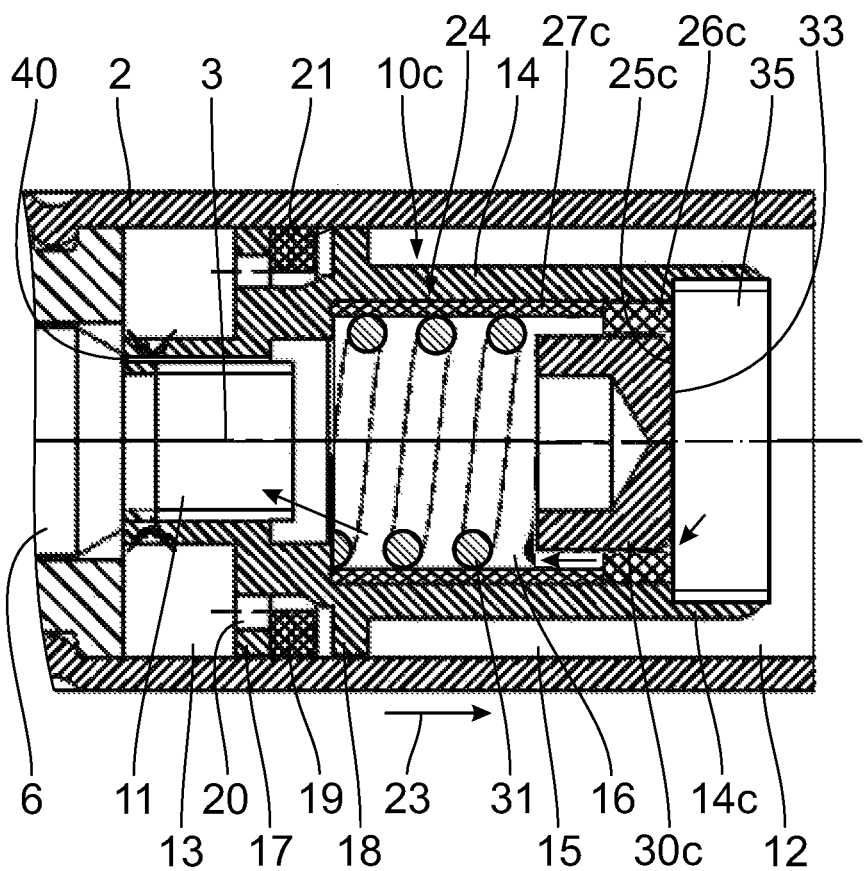
FIG. 8 shows the piston cylinder unit in accordance with FIG. 7 when the piston rod is operated in the push-in direction.

With reference to FIGS. 7 and 8 a fourth exemplary embodiment of the invention is described below. Constructionally identical parts are given the same reference symbols as for the three first exemplary embodiments, to the description of which reference is made herewith. Constructionally different, but functionally homogenous parts are given the same reference symbols followed by c.

The main difference of the piston cylinder unit 1c in comparison to the previous exemplary embodiments lies in the fact that the spring element 31c induces a spring action on the closing element 30c, which works in the push-in direction 23. This means that the piston valve 24c acts as pressure relief valve in the push-in direction 23.

The valve seat 25c on the end of the piston 10c lying opposite the piston rod 6 is formed accordingly. The valve seat 25c in particular is provided by the washer 28c. In the axial direction the internal sealing element 26c is held by the inner sleeve 27c with the guide section. The guide section serves guided displacement of the closing element 30 along the longitudinal axis 3.

Figure 9:
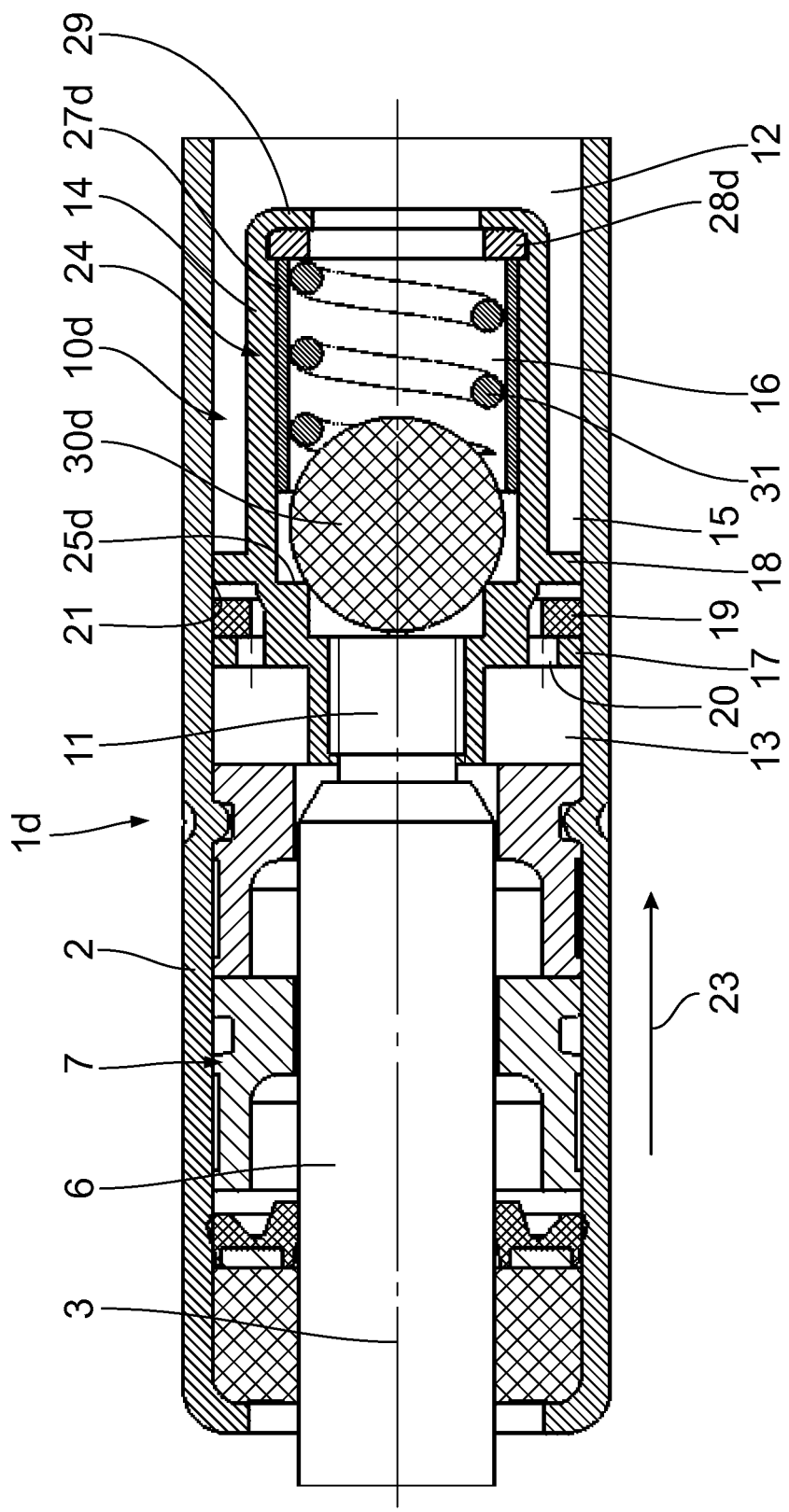
FIG. 9 shows an illustration corresponding to FIG. 2 of a piston cylinder unit in accordance with a fifth exemplary embodiment.
Figure 10:
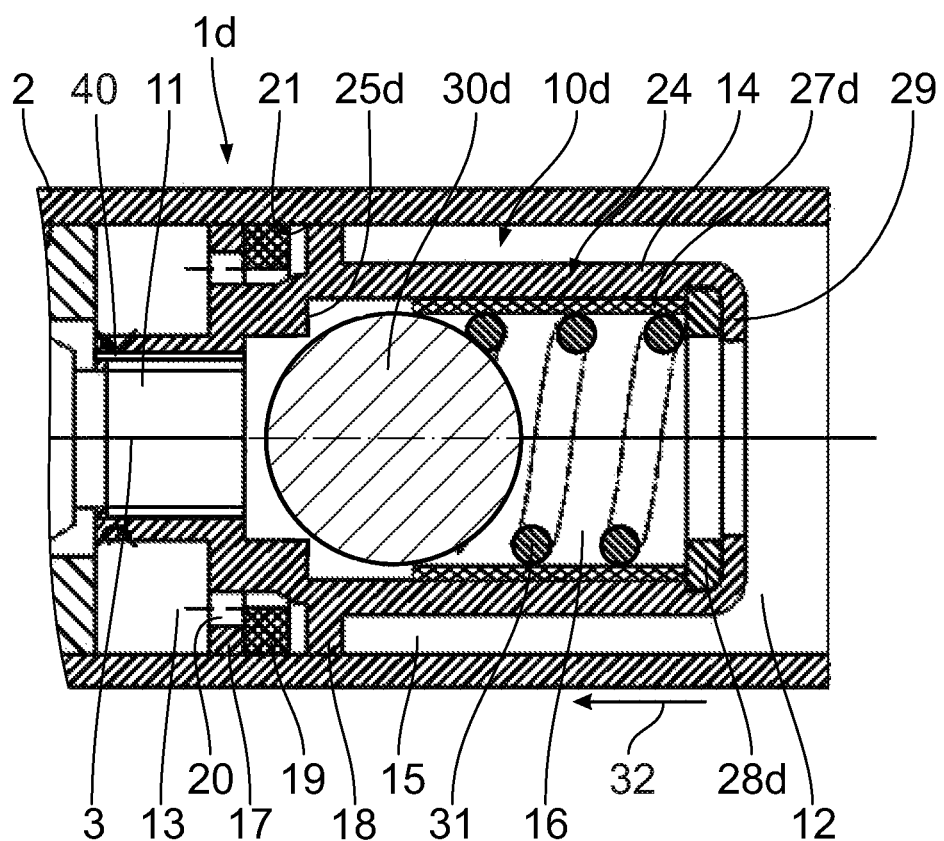
FIG. 10 shows the piston cylinder unit in accordance with FIG. 9 when the piston rod is operated in the pull-out direction.

With reference to FIGS. 9 and 10 a fifth exemplary embodiment of the invention is described below. Constructionally identical parts are given the same reference symbols as for the four first exemplary embodiments, to the description of which reference is made herewith. Constructionally different, but functionally homogenous parts are given the same reference symbols followed by d.

The main difference of the piston cylinder unit 1d in comparison to the first exemplary embodiment lies in the fact that the closing element 30d is formed as spherical element. The spherical element is configured as metal ball, for example steel ball, and has a sealing layer for example in the form of a rubber layer. The sealing layer permits the closing element 30d to make direct contact on the valve seat 25d. The constructional structure of the piston 10, in particular the piston valve 25d, is simplified. A separate, internal sealing element is unnecessary.

The spring element 31 in accordance with the first exemplary embodiment is arranged such that the spring action works along the pull-out direction 32. The piston cylinder unit 1d has an over-riding function in the pull-out direction.

Figure 11:
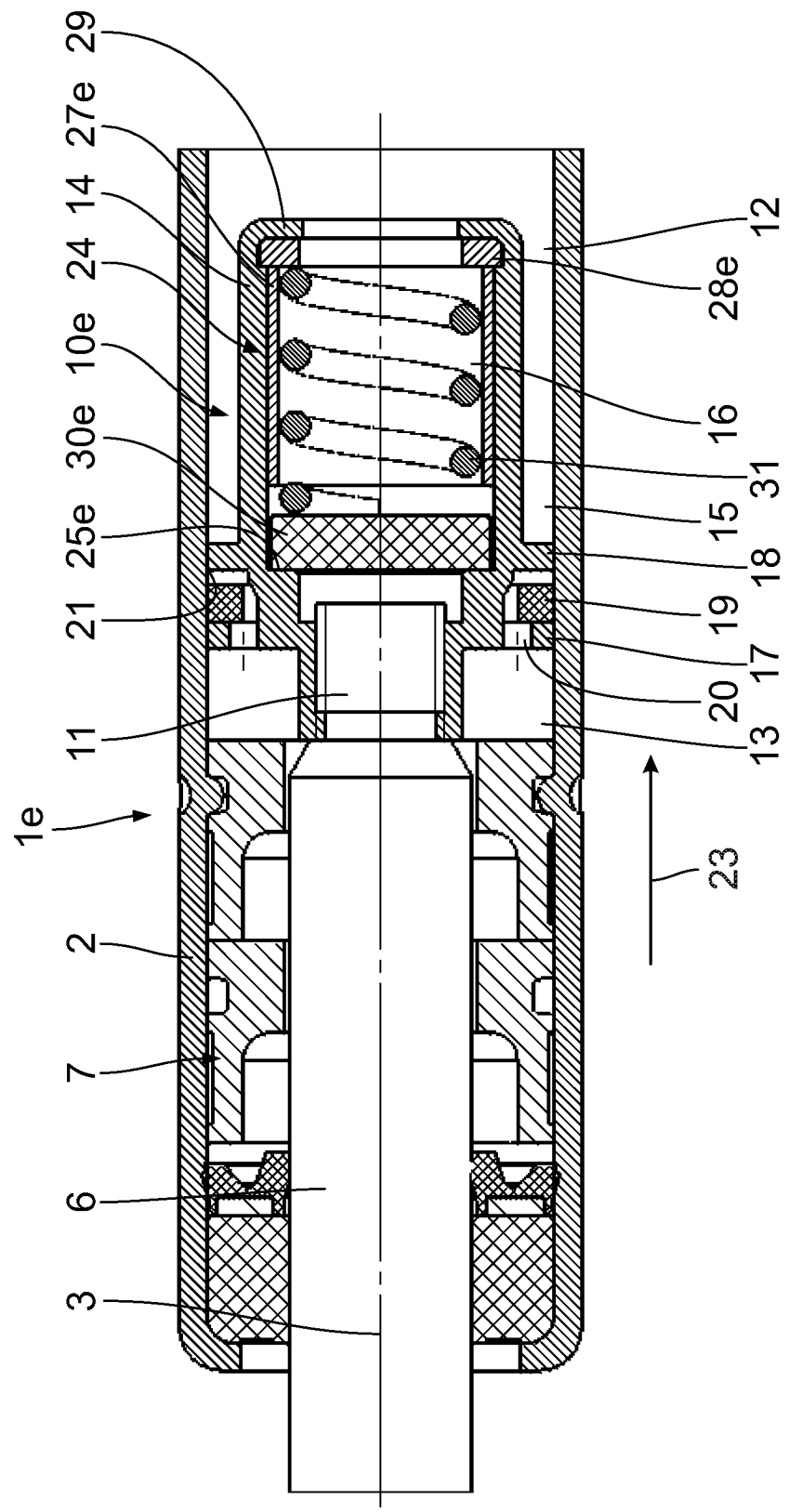
FIG. 11 shows an illustration corresponding to FIG. 2 of a piston cylinder unit in accordance with a sixth exemplary embodiment.
Figure 12:
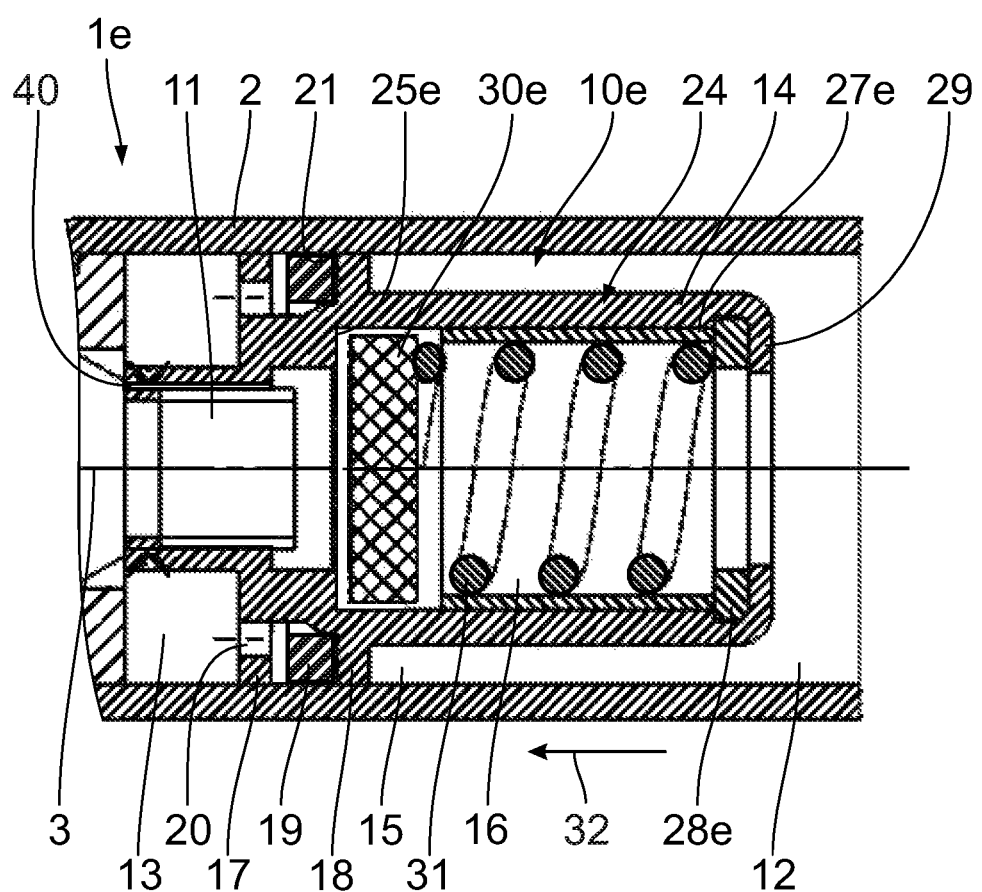
FIG. 12 shows the piston cylinder unit in accordance with FIG. 11 when the piston rod is operated in the pull-out direction.

With reference to FIGS. 11 and 12 a sixth exemplary embodiment of the invention is described below. Constructionally identical parts are given the same reference symbols as for the first five exemplary embodiments, to the description of which reference is made herewith. Constructionally different, but functionally homogenous parts are given the same reference symbols followed by e.

The main difference in comparison to the first exemplary embodiment lies in the fact that the closing element 30e is configured as cylinder, which has a sealing layer. Accordingly the closing element 30e can rest directly against the valve seat 25e at the front side. The sealing function is simplified. The construction of the components is simplified. A separate, internal sealing element is unnecessary.

The spring action exerted by the spring element 31 is oriented in the pull-out direction 32.

Figure 13:
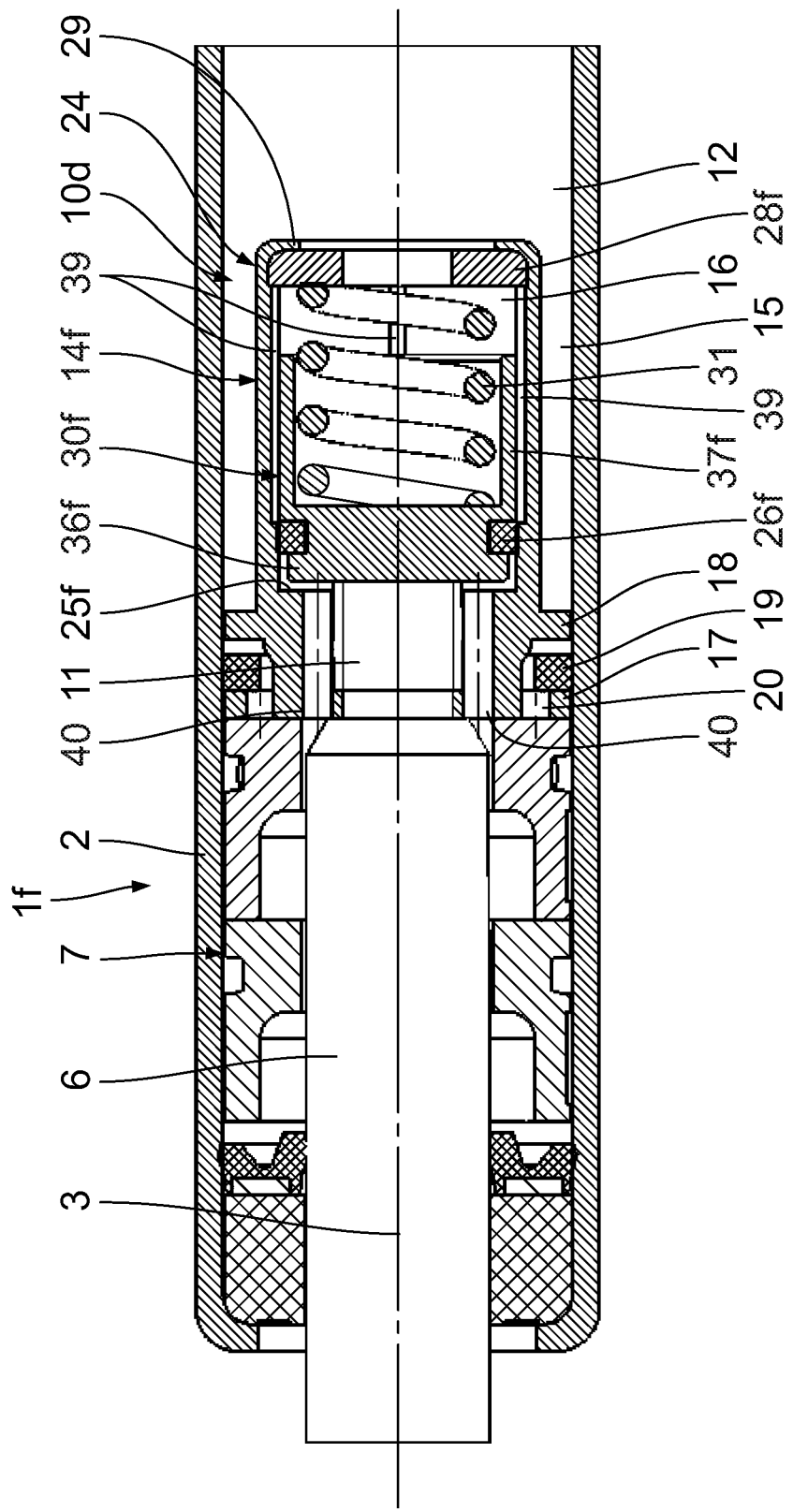
FIG. 13 shows an illustration corresponding to FIG. 2 of a piston cylinder unit in accordance with a seventh exemplary embodiment
Figure 14:
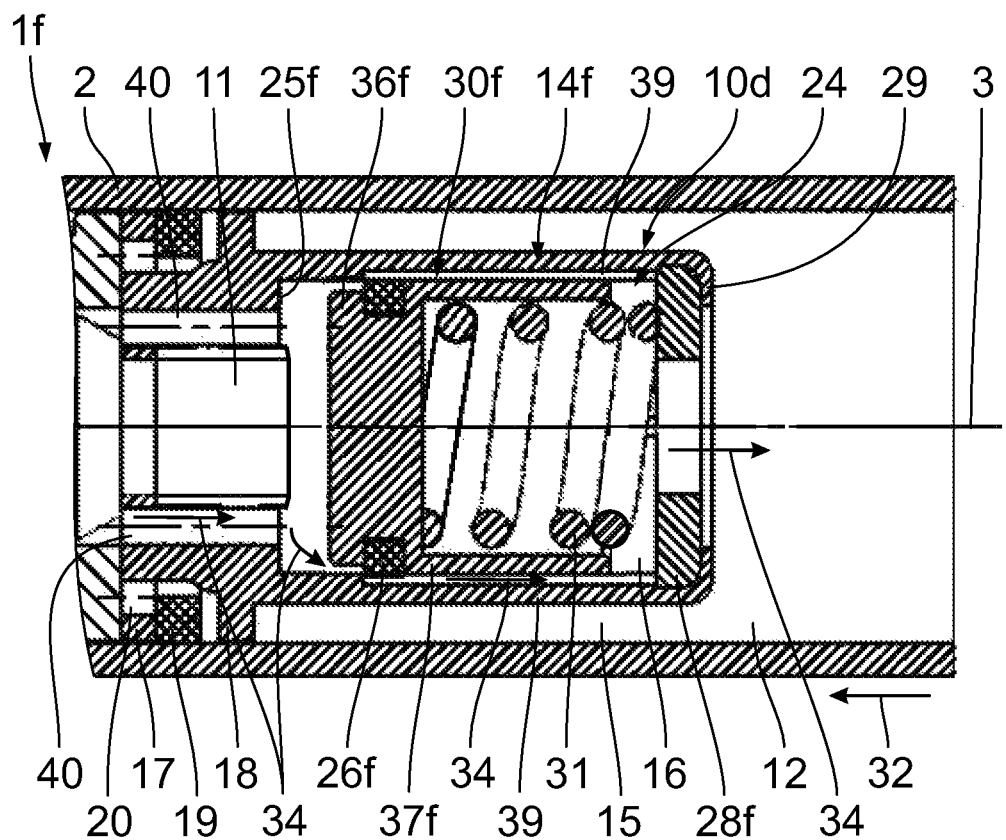
FIG. 14 shows the piston cylinder unit in accordance with FIG. 13 when the piston rod is operated in the pull-out direction.

With reference to FIGS. 13 and 14 a seventh exemplary embodiment of the invention is described below. Constructionally identical parts are given the same reference symbols as for the six first exemplary embodiments, to the description of which reference is made herewith. Constructionally different, but functionally homogenous parts are given the same reference symbols followed by f.

The piston cylinder unit 1f substantially corresponds to the piston cylinder unit 1b. The closing element 30f has a front sealing section 36f, turned toward the piston rod 6. In the vicinity of the sealing section 36f the closing element 30f has a circulating external groove, in which the internal sealing element 26f lies. The closing element 30f has a rear guide section 37 for the spring element 31. At the rear end turned toward the first sub-interior 12, the sleeve element 14f is delimited by means of the washer 28.

The internal sealing element 26f rests radially against an internal hydraulic cylinder jacket wall of the sleeve element 14f The internal hydraulic cylinder jacket wall forms a sealing surface for the internal sealing element 26f. A sealing seat is unnecessary in the case of the piston cylinder unit 1f.

The sealing surface of the sleeve element 14f extends along the longitudinal axis 3 over a sealing length $l_1$. A flow face of the sleeve element 14f joins the sealing surface along the longitudinal axis 3. The flow face differs from the sealing surface by an increased inside diameter of the internal hydraulic cylinder jacket face. The increased inside diameter of the sleeve element 14f in the vicinity of the flow face means that the internal sealing element 26f cannot seal the first fluid channel. As soon as the closing element 30f with the internal sealing element 26f is located in the vicinity of the flow face, closing of the first fluid channel is no longer possible. In such an arrangement a fluid flow from the second sub-interior 13 into the first sub-interior 12 is ensured through the first fluid channel. It is conceivable that the flow face on the inner wall of the sleeve element 14f is formed by an overall increased inside diameter being provided. In accordance with the exemplary embodiment shown the flow face is formed by four longitudinal slots 39 being provided, equally distributed along the outside circumference of the internal hydraulic cylinder jacket face of the sleeve element 14f. The spring action caused by the spring element 31 works along the pull-out direction 32.

A further difference in comparison to the previous exemplary embodiments lies in the fact that several through-flow channels 40 arranged eccentrically to the longitudinal axis 3 are provided, in order to ensure direct fluid flow along the first, internal fluid channel from the second sub-interior 13 into the first sub-interior 12. For example four, in particular six, more particularly eight through-flow openings 40 can be provided along the outside circumference around the spigot 11 of the piston rod 6.

Figure 15:
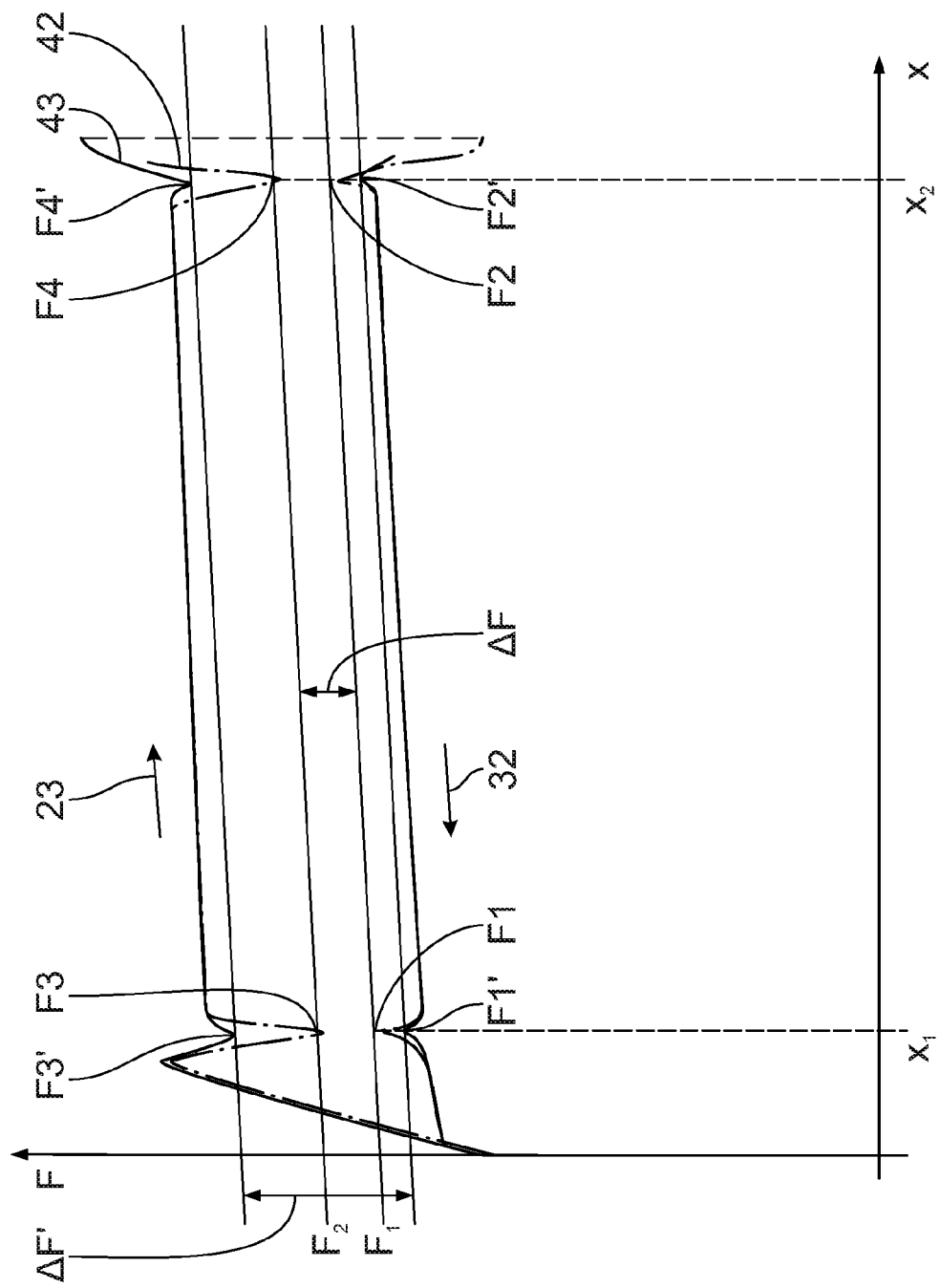
FIG. 15 shows a schematic illustration of a force distance diagram when an inventive piston cylinder unit is operated.

The function of an increased static friction coefficient, which the piston cylinder unit has in accordance with the invention, is described below on the basis of FIG. 15. FIG. 15 schematically shows a force-distance diagram, with the force F as ordinate and the displacement distance x of the piston rod 6 with the piston 10 along the longitudinal axis 3 as abscissa. A force distance graph 42 for a piston cylinder unit known from the prior art is illustrated with a dash-dotted line. The force distance graph 42 is substantially characterized by four points of force, significant force minima F3 and F4, which correspond to corresponding force maxima F1 and F2 in the push-out direction 32, arising in the push-in direction 23. The respective force difference ΔF is substantially constant along the push-in direction 23. This force difference ΔF defines a frictional force, which defines a static friction coefficient. In the case of a piston cylinder unit known from the state of the art the friction coefficient is approximately 30N for example.

In FIG. 15 additionally a force distance graph 43 for the piston cylinder unit 1 according to the invention is illustrated by the solid line. In principle the force distance graph 43 is similar to the force distance graph 42 in accordance with the state of the art. The main difference in the case of the force distance graph 43 lies in the fact that the frictional force, i.e. the force difference ΔF' between the force minima F3', F4' in the push-in direction 23 and the force maxima F1', F2' in the push-out direction 32 is increased. In accordance with the exemplary embodiment shown the force difference ΔF' can amount for example to 200N or more. The piston cylinder unit 1 according to the invention has a higher static friction coefficient. This arises as a result of the fact that during operation of the piston cylinder unit 1 in the push-in direction 23 additional over-riding of the differential pressure on the outside O-ring 19 is necessary.

In the push-out direction 32 over-riding of the spring action on the internal valve seat, caused by the spring element 31 as well as the frictional force, is necessary.

With reference to FIGS. 16 and 17 an eighth exemplary embodiment of the invention is described below. Constructionally identical examples are given the same reference symbols as for the seven first exemplary embodiments, to the description of which reference is made herewith. Constructionally different, but functionally homogenous parts are given the same reference symbols followed by g.

A difference in comparison to the previous exemplary embodiments lies in the fact that the piston valve 24g is designed to be seatless. This means that a valve seat is not provided. The internal sealing element 26g, which is configured as O-ring, acts in a sealing manner on an outside circumference along an outer contour of the closing element 30g.

The closing element 30g is substantially configured in the form of a cylinder piston, with a cylinder section turned toward the spring element 31 and with a flow transition area 41 turned toward the internal sealing element 26g. In the flow transition area 41, which extends along the longitudinal axis 3, the outer contour of the closing element 30g is variably configured. The variably configured outer contour of the closing element 30g is due to the fact that several recesses 42 are provided along the outside area of the closing element 30g. Within the flow transition area 41 the outer contour of the closing element 30g is not perfectly round. In the flow transition area 41 complete sealing contact of the closing element 30g on the internal sealing element 26g is prevented.

In accordance with the exemplary embodiment shown four recesses 42, which in each case are configured in pairs diametrically to the longitudinal axis 3 on the closing element 30g, are provided.

The recesses 42 in each case are configured wedge-shaped. The surface of the closing element 30g in the vicinity of the recesses 42 has an even contour, which is oriented to the longitudinal axis 3 at an angle of inclination n. The angle of inclination n in accordance with the exemplary embodiment shown amounts to 15°. The angle of inclination n amounts in particular to between 5° and 45°.

Along the outside circumference of the closing element 30g more than or less than four recesses can also be arranged. In accordance with the exemplary embodiment shown the recesses 42 in each case are identical. It is conceivable to implement the recesses 42 otherwise, i.e. with different widths of the inclined surfaces and/or different angles of inclination.

In the flow transition area 41 the cross-section of the closing element 30g reduces continuously after the cylinder area. Accordingly the resulting flow cross-section between the outer contour of the closing element 30g and the internal contour of the internal sealing element 26g becomes larger. A throttle channel, which has a variable, in particular continuously variable flow cross-section along the longitudinal axis 3, is formed as a result of this respective free space of the recesses 42 between the closing element 30g and the internal sealing element 26g. In particular the flow cross-section is configured so that it increases along the longitudinal axis 3 in a direction oriented away from the spring element 31.

The at least one throttle channel of the closing element 30g allows continuous opening of the fluid connection between the sub-work spaces. The at least one throttle channel is closable. The at least one throttle channel in particular is closed through axial displacement of the closing element 30g, so that the closing element 30g rests against the internal sealing element 26g in a sealing manner When the piston rod 6 with the piston valve 24g connected to it is displaced along the pull-out direction 32 the closing element 30g is lifted against the spring action caused by the spring element 31 from the internal sealing element 26g. This means that the closing element 30g is moved against the pull-out direction 32 in accordance with FIG. 16 to the right along the longitudinal axis 3. In the vicinity of the recesses 42 the internal sealing element 26g no longer rests against the closing element 30g in a sealing manner. In the area of the recesses 42 therefore through-flow channels are formed through which the fluid can flow. By further displacement of the closing element 30g against the pull-out direction 32 the flow through cross-section becomes continuously larger due to the inclined configuration of the recesses 42. The through-flow channels, which are delimited by the recesses 42 of the closing element 30g and into the internal sealing element 26g in the circumferential direction, form throttle channels.

A further difference lies in the fact that the closing element 30g on a front face 33g turned toward the piston rod 6 is unevenly configured. The face 33g has a curved contour, which is dome-shaped in particular. As a result the contact area, with which the closing element 30g rests against the spigot 11, is reduced. It is conceivable, for further reduction of the contact area between the face 33g of the closing element 30g and the spigot 11, to design its free front face with a curve. It is advantageous if the two opposite lying front faces of the spigot 11 and the closing element 30g are convex in each case. The piston valve 24g acts as pressure relief valve in the pull-out direction 32.

Figure 18:
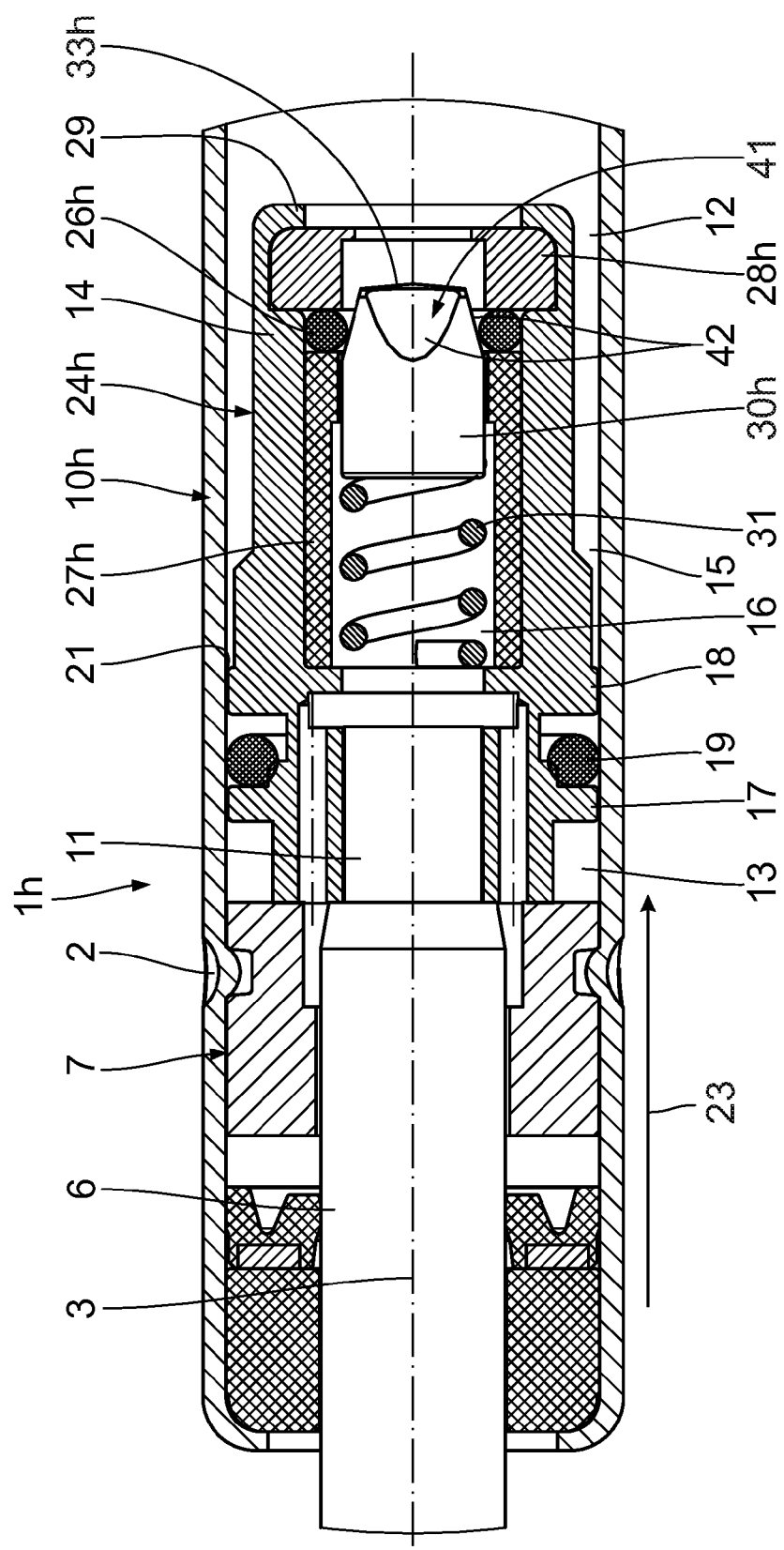
FIG. 18 shows an illustration corresponding to FIG. 2 of a piston cylinder unit in accordance with a ninth exemplary embodiment.

With reference to FIG. 18 a ninth exemplary embodiment of the invention is described below. Constructionally identical examples are given the same reference symbols as for the eight first exemplary embodiments, to the description of which reference is made herewith. Constructionally different, but functionally homogenous parts are given the same reference symbols followed by h.

This embodiment, in particular the closing element 30h substantially corresponds to that of the eighth exemplary embodiment. The main difference in comparison to the exemplary embodiment shown in FIGS. 16 and 17 lies in the fact that the spring element 31 exerts a spring action on the closing element 30h, which works in the push-in direction 23. The piston valve 24h acts as pressure relief valve in the push-in direction 23.

Figure 19:
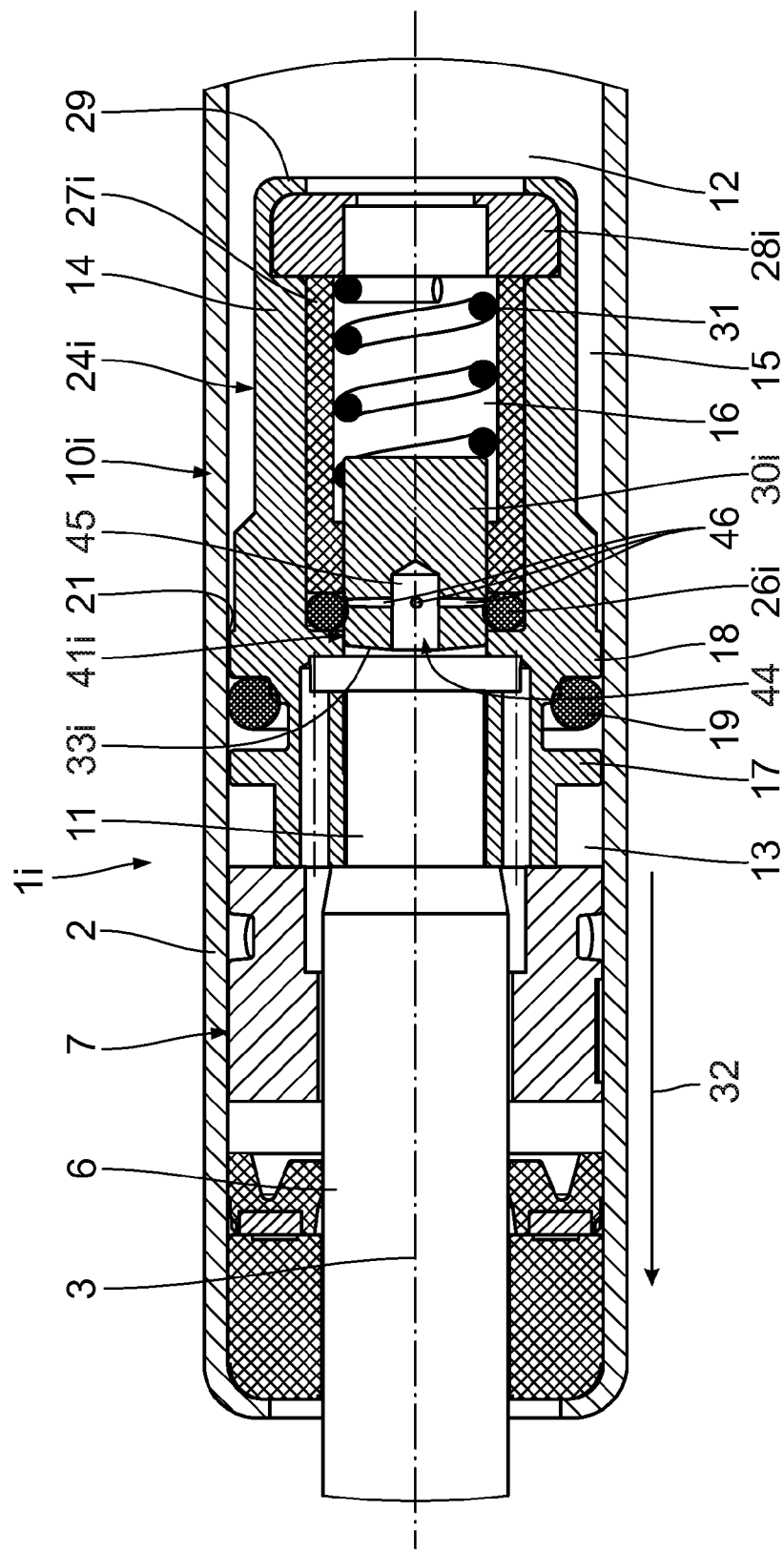
FIG. 19 shows an illustration corresponding to FIG. 2 of a piston cylinder unit in accordance with a tenth exemplary embodiment.

With reference to FIG. 19 a tenth exemplary embodiment of the invention is described below. Constructionally identical examples are given the same reference symbols as for the nine first exemplary embodiments, to the description of which reference is made herewith. Constructionally different, but functionally homogenous parts are given the same reference symbols followed by i.

In the case of the closing element 30i the flow transition area 41i has a substantially unchanged outer contour. A through-flow channel 44 as throttle channel is configured in the case of the closing element 30i by flow channels lying on the inside in the closing element 30i. The flow channel 44 has an axial section 45, which extends from the front face 33i turned away from the spring element 31 along the longitudinal axis 3 into the closing element 30i. The front face 33i in the case of this exemplary embodiment is substantially even. The flow channel 44 is arranged on the closing element 30i concentrically to the longitudinal axis 3. The axial section 45 communicates in terms of flow with several, in accordance with the exemplary embodiment shown, four radial sections 46.

In the case of an embodiment of the closing element 30i shown in FIG. 19 the closing element is arranged along the longitudinal axis 3 such that a fluid connection is not possible through the internal subspace 16 of the piston valve 24i, since the flow channel 44, in particular the radial sections 46, do not communicate in terms of flow with the internal subspace 16. When the piston rod 6 with the piston valve connected to it 24i is operated along the pull-out direction 32 the fluid pressure causes an axial force on the front face 33i of the closing element 30i against the spring action and against the spring action caused by the spring element 31, i.e. against the pull-out direction 32. As a result the closing element 30*i* is displaced to the right along the longitudinal axis 3 against the pull-out direction 32 in accordance with FIG. 18.

As soon as the closing element 30*i* with the radial sections 46 is displaced in the axial direction past the internal sealing element 26*i*, a fluid flow is possible through the flow channel 44. Further displacement of the closing element 30*i* with the front face 33*i* past the internal sealing element 26*i* means that the complete cross-section of the closing element 30*i* is opened and a substantially unhindered fluid flow is permitted. This means that the piston valve 24*i* in accordance with the exemplary embodiment shown allows a gradual increase of the fluid flow, i.e. an intermittently variable flow.

Figure 20:
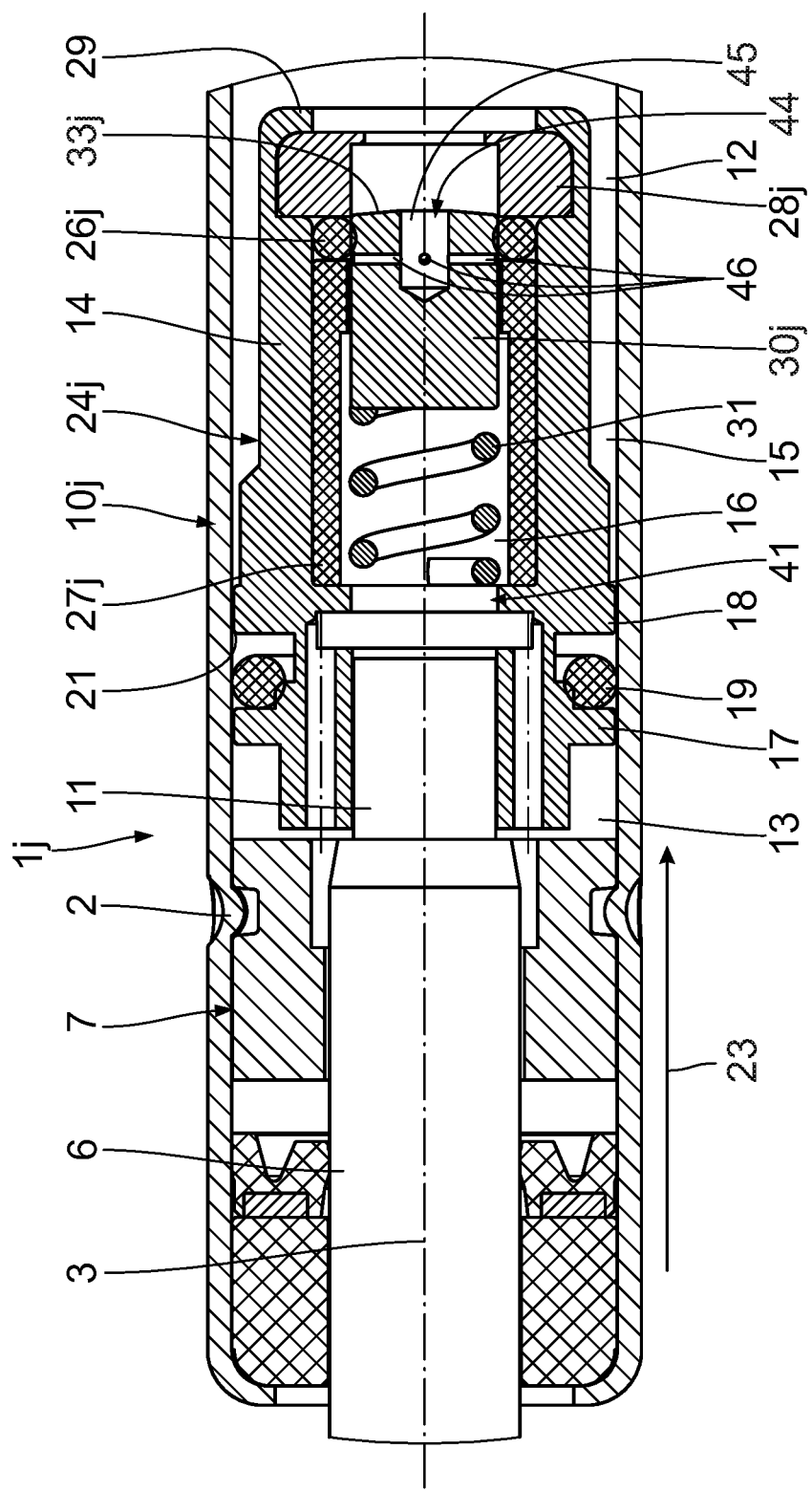
FIG. 20 shows an illustration corresponding to FIG. 2 of a piston cylinder unit in accordance with an eleventh exemplary embodiment.

With reference to FIG. 20 an eleventh exemplary embodiment of the invention is described below. Constructionally identical examples are given the same reference symbols as for the ten first exemplary embodiments, to the description of which reference is made herewith. Constructionally different, but functionally homogenous parts are given the same reference symbols followed by j.

This embodiment, in particular the closing element 30*j* substantially corresponds to that of the tenth exemplary embodiment. The main difference of the exemplary embodiment shown in FIG. 18 lies in the fact that the spring element 31 exerts a spring action on the closing element 30*j*, which works in the push-in direction 23. The piston valve 24*j* acts as pressure relief valve in the push-in direction 23.

Figure 21:
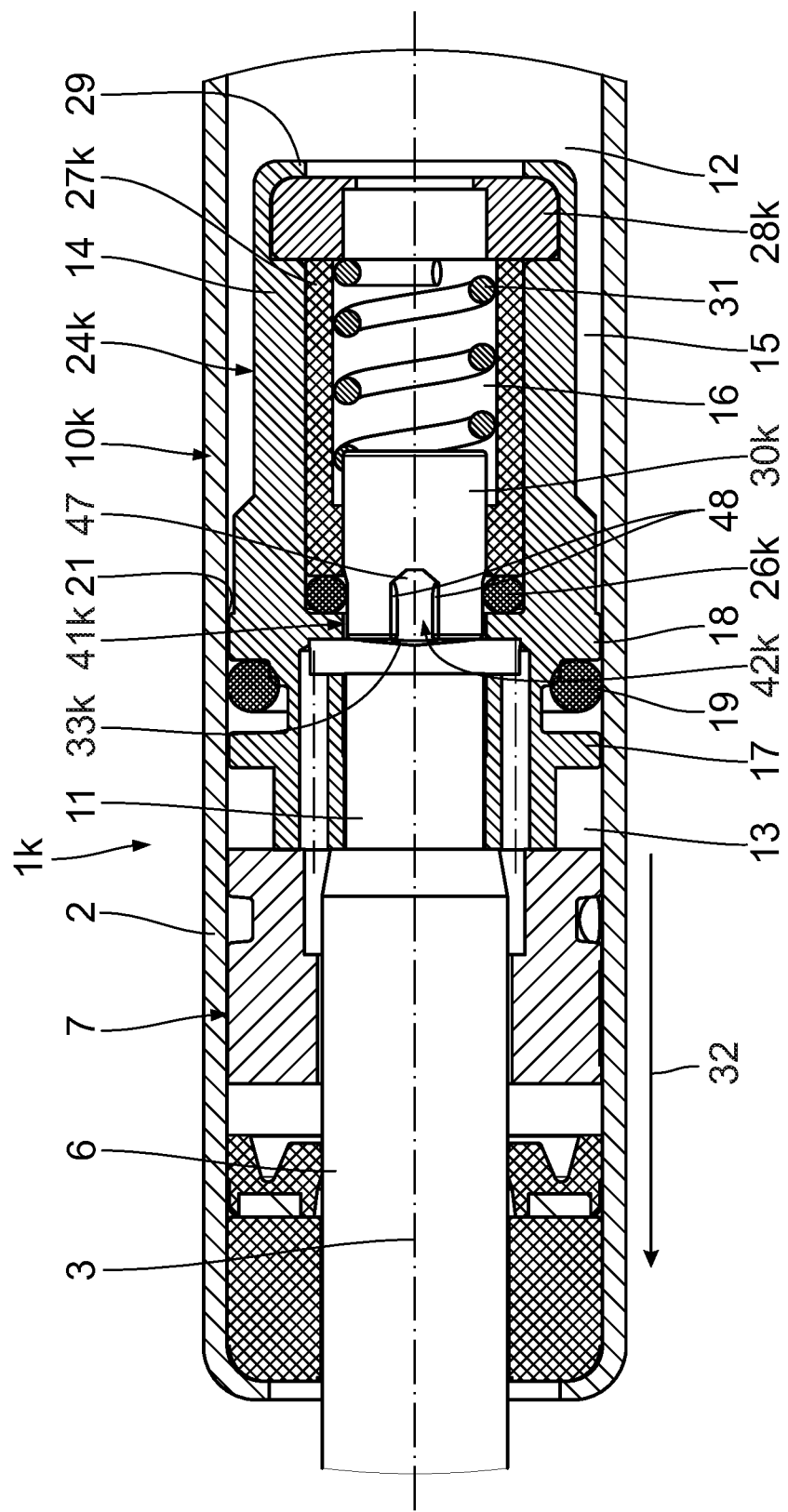
FIG. 21 shows an illustration corresponding to FIG. 2 of a piston cylinder unit in accordance with a twelfth exemplary embodiment.

With reference to FIG. 21 a twelfth exemplary embodiment of the invention is described below. Constructionally identical examples are given the same reference symbols as for the eleven first exemplary embodiments, to the description of which reference is made herewith. Constructionally different, but functionally homogenous parts are given the same reference symbols followed by k.

The main difference of this exemplary embodiment lies in the configuration of the recesses 42*k*. The recesses 42*k* in accordance with this exemplary embodiment are configured as axial slots with a discharge area 47 turned toward the spring element 31. The discharge area constitutes the transition of the maximum outside diameter of the closing element 30*k* up to the maximum groove depth in the vicinity of the recess 42*k*. The recess 42*k* has lateral flanks 48, which are inclined in relation to the groove base of the recess 42*k*.

Overall four recesses 42*k* are provided along the outside circumference of the closing element 30*k*. Along the longitudinal axis 3 the groove depth is substantially constant.

Figure 22:
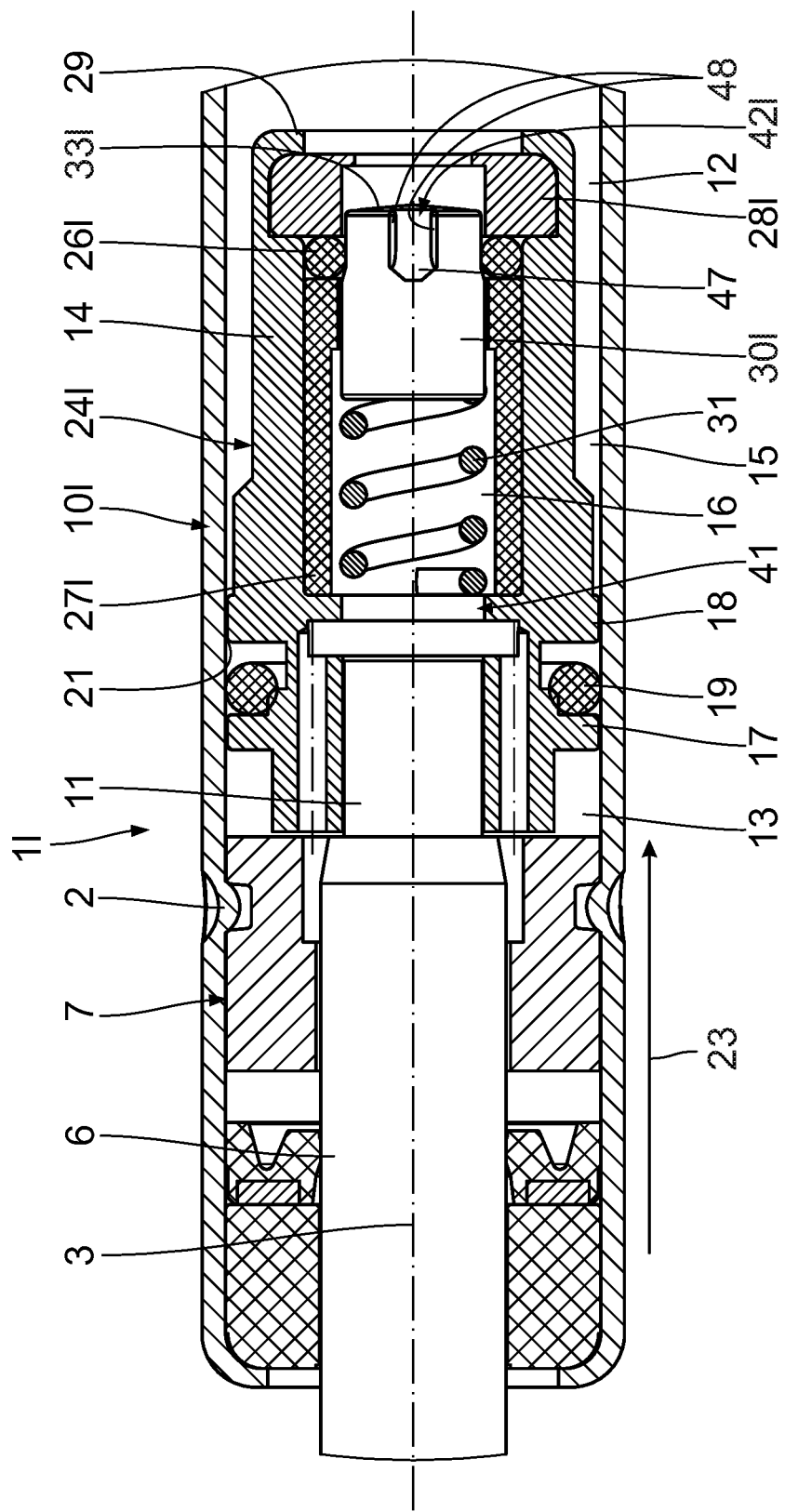
FIG. 22 shows an illustration corresponding to FIG. 2 of a piston cylinder unit in accordance with a thirteenth exemplary embodiment.

With reference to FIG. 22 a thirteenth exemplary embodiment of the invention is described below. Constructionally identical examples are given the same reference symbols as for the twelve first exemplary embodiments, to the description of which reference is made herewith. Constructionally different, but functionally homogenous parts are given the same reference symbols followed by l.

This embodiment, in particular the closing element 30*l* substantially corresponds to that of the twelfth exemplary embodiment. The main difference of the exemplary embodiment shown in FIG. 21 lies in the fact that the spring element 31 exerts a spring action on the closing element 30*l*, which works in the push-in direction 23. The piston valve 24*l* acts as pressure relief valve in the push-in direction 23.

Figure 23:
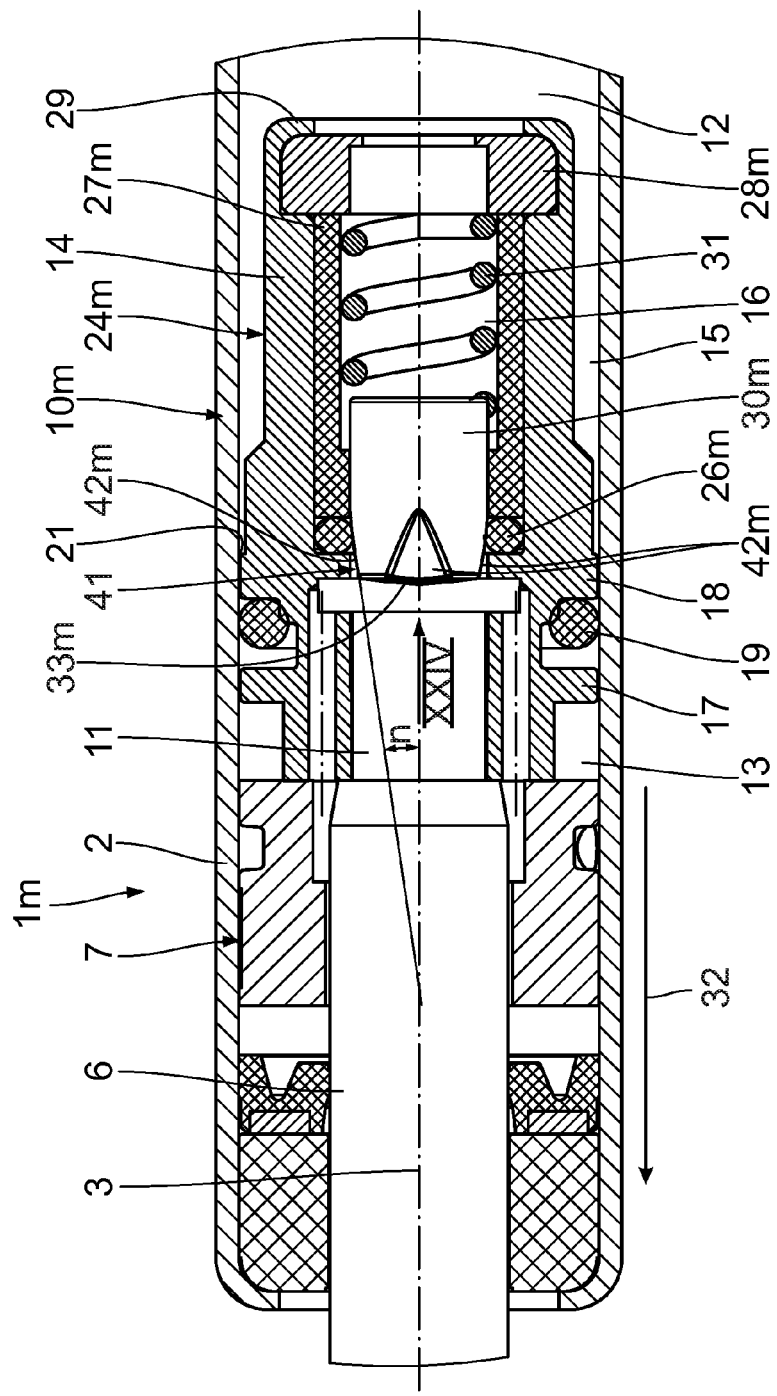
FIG. 23 shows an illustration corresponding to FIG. 2 of a piston valve in accordance with a fourteenth exemplary embodiment.
Figure 24:
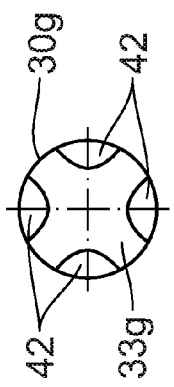
FIG. 24 shows a view in accordance with arrow XXIV in FIG. 23.

With reference to FIGS. 23 and 24 a fourteenth exemplary embodiment of the invention is described below. Constructionally identical examples are given the same reference symbols as for the thirteen first exemplary embodiments, to the description of which reference is made herewith. Constructionally different, but functionally homogenous parts are given the same reference symbols followed by m.

The main difference in comparison to the exemplary embodiments in FIG. 16 lies in the fact that the recesses 42*m* are cone-shaped in each case. This means that the recess 42*m* is concave in relation to the outer contour of the closing element 30*m*. Additionally the contour is configured in relation to the longitudinal axis 3 at an angle of inclination n.

It is also conceivable that the closing element has convex bulges in place of the concave recesses, so that the recesses themselves are formed by the gaps located between the convex bulges.

It is also conceivable to combine straight and concave recesses and/or convex bulges on one closing element.

Figure 25:
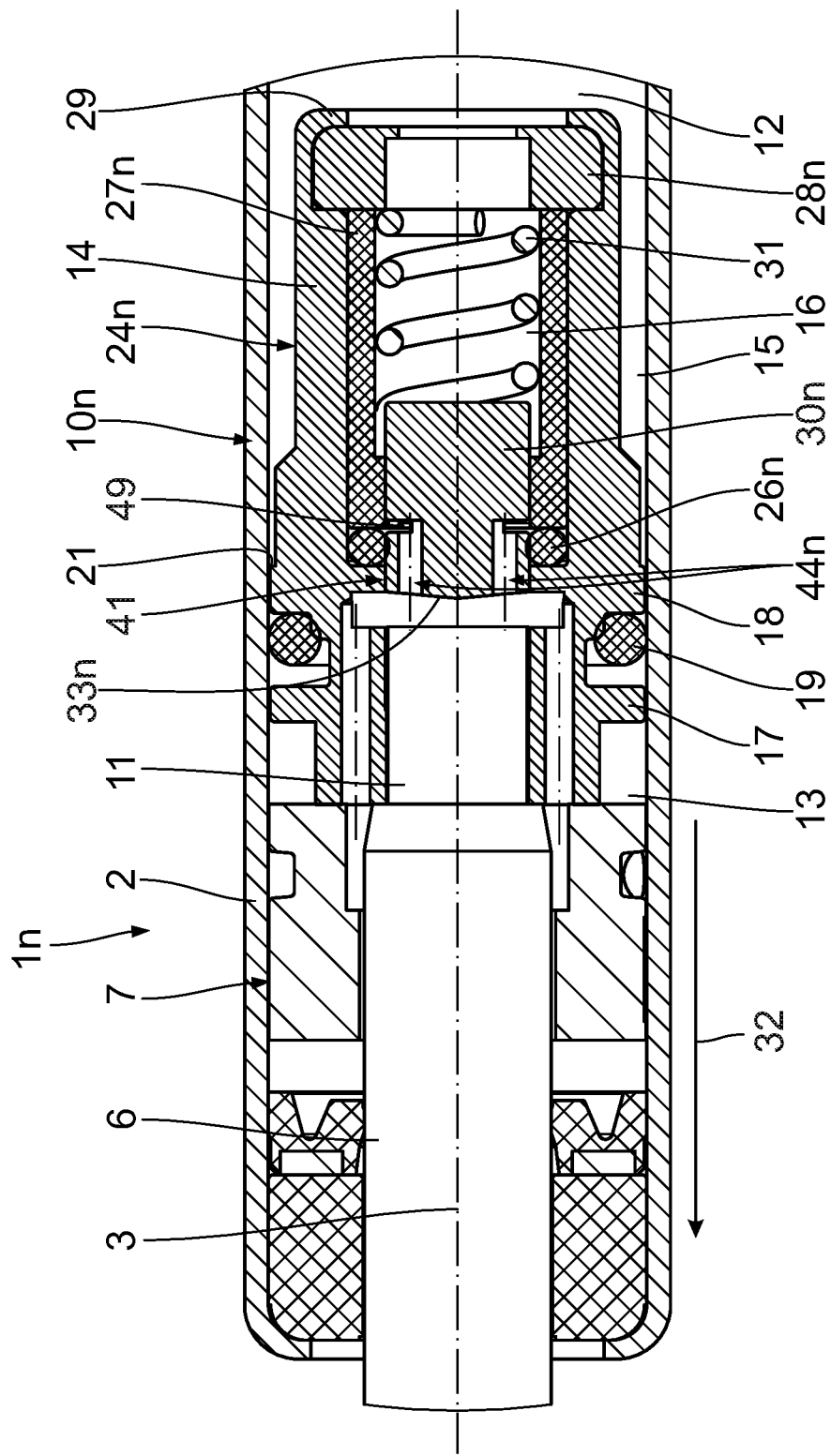
FIG. 25 shows an illustration corresponding to FIG. 2 of a piston valve in accordance with a fifteenth exemplary embodiment.

With reference to FIG. 25 a fifteenth exemplary embodiment of the invention is described below. Constructionally identical examples are given the same reference symbols as for the fourteen first exemplary embodiments, to the description of which reference is made herewith. Constructionally different, but functionally homogenous parts are given the same reference symbols followed by n.

This exemplary embodiment substantially corresponds to that in accordance with FIG. 18, whereby several, in accordance with the exemplary embodiment 4 shown, four flow channels are provided, which extend axially and are arranged eccentrically to the longitudinal axis 3. The axial sections 45 of the flow channels 44 open out in an external groove 49, which is configured as annular groove along the entire outer circumference. The external groove 49 forms a constant radial section. The function mode of this embodiment substantially corresponds to that of the exemplary embodiment in FIG. 19.

What is claimed is:

1. A fluid-filled piston cylinder unit comprising:
a housing comprising a longitudinal axis and an interior;
a piston rod leading out from the housing in a sealing manner, which can be displaced along the longitudinal axis;
a piston connected to the piston rod, wherein the piston divides the interior into a first sub-interior and a second sub-interior, the piston having a first fluid channel and a second fluid channel for a fluid flow between the first sub-interior and the second sub-interior in each case, the piston having a piston valve for closing the first fluid channel, the piston valve opening the first fluid channel based on a fluid pressure, the piston having a sleeve element, the piston valve being provided within the sleeve element, the piston valve having a closing element, which is configured to be displaced along the longitudinal axis, and a spring element, which exerts a spring action on the closing element for closing the piston valve, the piston valve having an internal sealing element, against which the closing element rests for closing the piston valve, wherein an outer sealing element is provided for sealing the second fluid channel in dependence of a displacement direction of the piston rod, the outer sealing element being movable along the longitudinal axis with respect to the piston between a first position and a second position, the second fluid channel being sealed by the outer sealing element in the first position and the second fluid channel being open in the second position.

2. A fluid-filled piston cylinder unit in accordance with claim 1, wherein the first fluid channel is located within the sleeve element, the sleeve element comprising a sleeve element interior space, the piston comprising an inner sleeve, the inner sleeve being arranged in the sleeve element interior space, the inner sleeve comprising an inner sleeve interior space, at least a portion of the spring element being arranged in the inner sleeve element interior space.

3. A fluid-filled piston cylinder unit in accordance with claim 1, wherein the second fluid channel is located outside of the sleeve element.

4. A fluid-filled piston cylinder unit in accordance with claim 1, wherein the piston valve has a valve seat.

5. A fluid-filled piston cylinder unit in accordance with claim 4, wherein the spring action is oriented at least proportionately toward the valve seat.

6. A fluid-filled piston cylinder unit in accordance with claim 4, wherein the internal sealing element is arranged in the vicinity of the valve seat.

7. A fluid-filled piston cylinder unit in accordance with claim 4, wherein the closing element is uneven at the front side.

8. A fluid-filled piston cylinder unit in accordance with claim 4, wherein the closing element has a sealing layer for closing the piston valve.

9. A fluid-filled piston cylinder unit in accordance with claim 4, wherein the closing element is formed one of as cylinder piston and as spherical element.

10. A fluid-filled piston cylinder unit in accordance with claim 4, wherein the closing element has an integrated throttle channel with a flow cross-section.

11. A fluid-filled piston cylinder unit in accordance with claim 1, wherein the sleeve element on an end turned away from the piston rod has a collar.

12. A fluid-filled piston cylinder unit in accordance with claim 1, wherein the sleeve element on an end turned away from the piston rod has a collar, which is turned inward radially.

13. A fluid-filled piston cylinder unit in accordance with claim 1, wherein the sleeve element is detachably connected to the piston rod.

14. A fluid-filled piston cylinder unit in accordance with claim 1, wherein the sleeve element is screwed on a spigot of the piston rod.

15. A fluid-filled piston cylinder unit in accordance with claim 1, comprising a setting element for variably adjusting the fluid pressure for releasing the piston valve.

16. A fluid-filled piston cylinder unit comprising:
a housing comprising a longitudinal axis and an interior;
a piston rod leading out from the housing in a sealing manner, which can be displaced along the longitudinal axis;
a piston connected to the piston rod, the piston dividing the interior into a first sub-interior and a second sub-interior, the piston having a first fluid channel and a second fluid channel for a fluid flow between the first sub-interior and the second sub-interior in each case, the piston having a piston valve for closing the first fluid channel, the piston valve opening the first fluid channel based on a fluid pressure, the piston valve having a closing element, the closing element having an integrated throttle channel, said integrated throttle channel comprising an axial section and at least one radial section, wherein said radial section can be sealed with the internal sealing element for permitting fluid flow through the integrated throttle channel.

17. A fluid-filled piston cylinder unit comprising:
a housing comprising a longitudinal axis and an interior;
a piston rod leading out from the housing in a sealing manner, the piston being displaceable along the longitudinal axis;
a piston connected to the piston rod, wherein the piston divides the interior into a first sub-interior and a second sub-interior, the piston having a first fluid channel and a second fluid channel for a fluid flow between the first sub-interior and the second sub-interior in each case, the piston having a piston valve for closing the first fluid channel, the piston valve opening the first fluid channel based on a fluid pressure, the piston having a sleeve element, the piston valve being provided within the sleeve element, the piston valve having a closing element and a spring element, the closing element being configured to be displaced along the longitudinal axis, the spring element exerting a spring action on the closing element for closing the piston valve, the piston valve having an internal sealing element, against which the closing element rests for closing the piston valve, wherein an outer sealing element is provided for sealing the second fluid channel based on a displacement direction of the piston rod, the outer sealing element being located along the second fluid channel between a first radial web and a second radial web of the piston spaced at a distance along the longitudinal axis, wherein the outer sealing element is laid on the second radial web in a sealing manner for sealing the second fluid channel.

* * * * *